United States Patent
Cheng et al.

(10) Patent No.: US 6,921,482 B1
(45) Date of Patent: Jul. 26, 2005

(54) SKINNED HOLLOW FIBER MEMBRANE AND METHOD OF MANUFACTURE

(75) Inventors: Kwok-Shun Cheng, Nashua, NH (US); T. Dean Gates, Bedford, MA (US); Larry Y. Yen, Andover, MA (US); Rajnikant B. Patel, Tewksbury, MA (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 09/889,961
(22) PCT Filed: Jan. 27, 2000
(86) PCT No.: PCT/US00/02194
§ 371 (c)(1),
(2), (4) Date: Jul. 24, 2001
(87) PCT Pub. No.: WO00/44482
PCT Pub. Date: Aug. 3, 2000

Related U.S. Application Data
(60) Provisional application No. 60/117,854, filed on Jan. 29, 1999.

(51) Int. Cl.$^7$ .......................... B01D 69/00; B01D 71/28
(52) U.S. Cl. ............................. 210/500.23; 210/500.36; 210/500.27; 210/640; 210/321.8; 95/46; 264/41
(58) Field of Search ...................... 210/500.36, 500.27, 210/500.23, 490, 321.8; 264/41; 427/244; 96/4; 95/45, 46

(56) References Cited

U.S. PATENT DOCUMENTS

| | | | |
|---|---|---|---|
| 4,478,695 A | * | 10/1984 | Ezzell et al. ................ 205/517 |
| 4,557,955 A | * | 12/1985 | Walch et al. ............... 428/35.5 |
| 4,846,977 A | * | 7/1989 | DeVellis et al. ............ 210/640 |
| 4,902,456 A | | 2/1990 | Yen et al. |
| 4,906,377 A | | 3/1990 | Yen et al. |
| 4,990,294 A | | 2/1991 | Yen et al. |
| 5,032,274 A | | 7/1991 | Yen et al. |
| 5,082,472 A | * | 1/1992 | Mallouk et al. ................ 95/49 |
| 5,154,827 A | | 10/1992 | Ashelin et al. |
| 5,158,680 A | | 10/1992 | Kawai et al. |
| 5,490,931 A | | 2/1996 | Chung et al. |
| 5,695,702 A | | 12/1997 | Niermeyer |
| 5,762,789 A | | 6/1998 | de los Reyes et al. |
| 5,855,783 A | | 1/1999 | Shucosky et al. |
| 6,149,132 A | * | 11/2000 | Ostrobrod ................... 254/368 |
| 6,149,810 A | * | 11/2000 | Gonzalez-Martin et al. .......... 210/321.84 |
| 6,582,496 B1 | * | 6/2003 | Cheng et al. .................. 95/46 |

FOREIGN PATENT DOCUMENTS

| | | |
|---|---|---|
| DE | 3444387 | 7/1985 |
| EP | 0 175 432 | 3/1986 |
| EP | 0 217 482 | 4/1987 |
| EP | 0 299 459 | 1/1989 |
| EP | 0 340 732 | 11/1989 |

(Continued)

OTHER PUBLICATIONS

Derwent Publication XP–002142276 Abstract of JP 04 354521.

Primary Examiner—Ana Fortuna
(74) Attorney, Agent, or Firm—Timothy J. King; Paul J. Cook; Mykrolis Corporation

(57) ABSTRACT

Hollow fiber membranes having a skinned surface on one diameter, and a porous surface on the opposite diameter arm produced from perfluorinated thermoplastic polymers by extruding a heated solution of the polymer having a lower critical solution temperature directly into a cooling bath to form the porous membrane by liquid-liquid phase separation. Extrusion can be conducted either vertically or horizontally. The hollow fiber membranes are useful as ultrafiltration membranes and as membrane contactors.

18 Claims, 11 Drawing Sheets

FOREIGN PATENT DOCUMENTS

| | | |
|---|---|---|
| EP | 0 343 247 | 11/1989 |
| EP | 0 559 149 | 9/1993 |
| EP | 0 803 281 | 10/1997 |
| EP | 0 855 212 | 7/1998 |
| EP | 1004615 A2 * | 5/2000 |
| FR | 2 566 003 | 12/1985 |
| WO | WO97/40924 * | 6/1996 |
| WO | WO99/38897 * | 5/1999 |
| WO | WO 0044479 | 8/2000 |
| WO | WO 0044480 | 8/2000 |
| WO | WO 0044482 | 8/2000 |
| WO | WO 0044483 | 8/2000 |
| WO | WO 0044484 | 8/2000 |
| WO | WO 0044485 | 8/2000 |
| WO | WO00/61267 * | 10/2000 |

* cited by examiner

Figur 10.
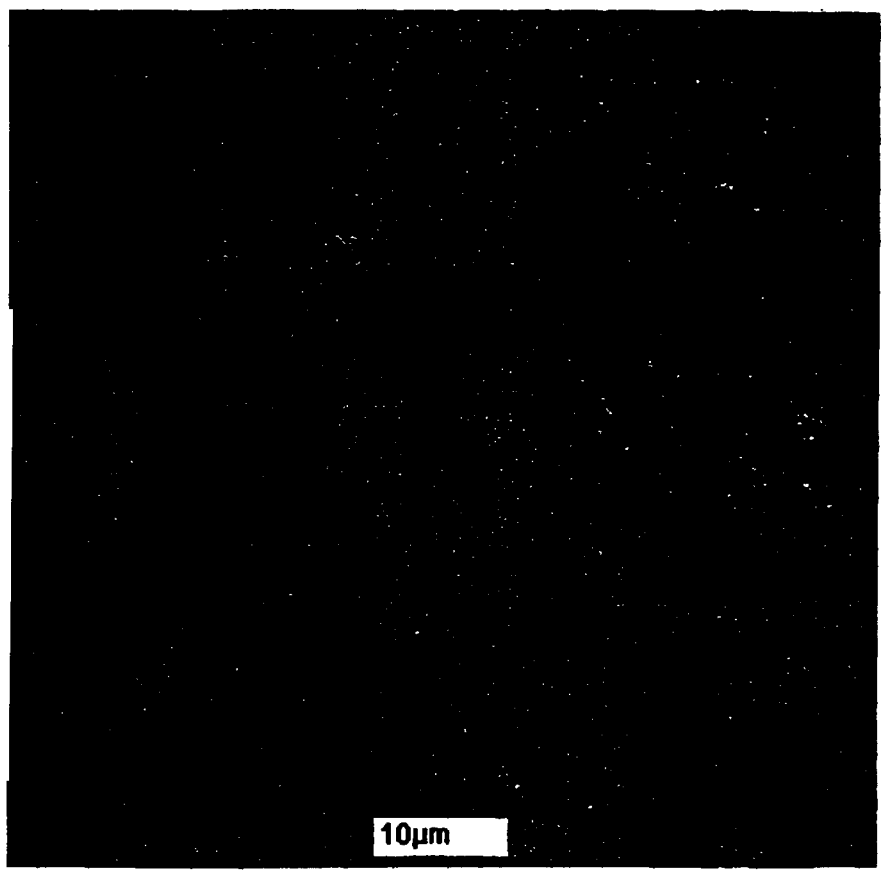

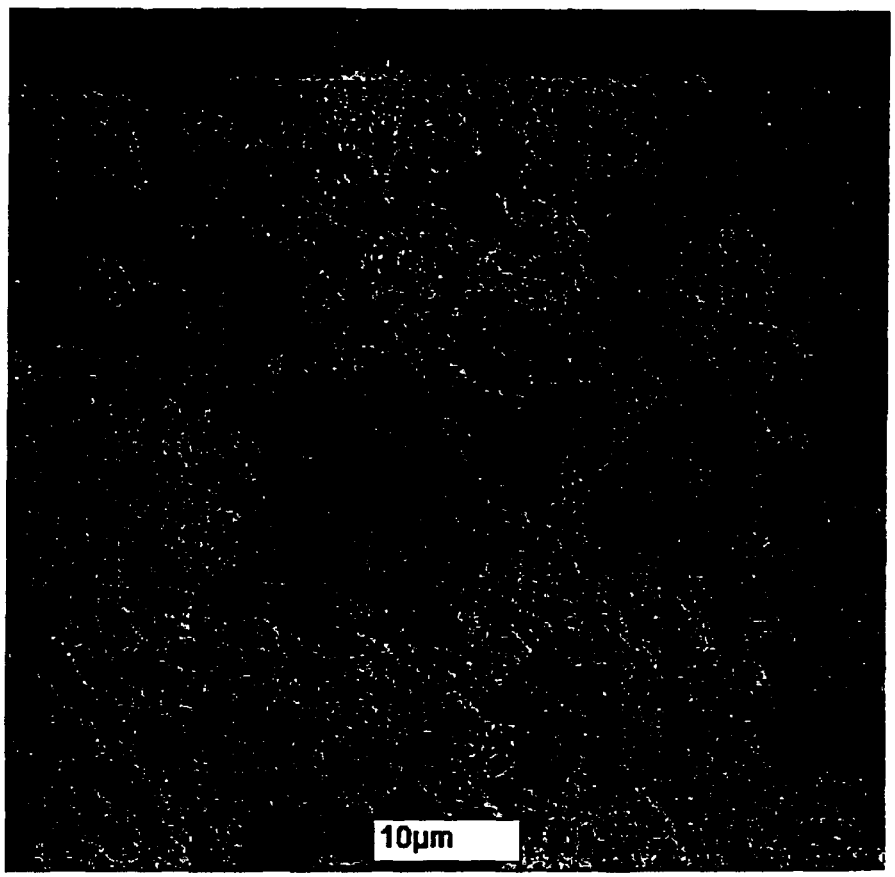
Fig. 11. Cross-Section of Fiber Near Outside Surface

SKINNED HOLLOW FIBER MEMBRANE AND METHOD OF MANUFACTURE

This application claims the benefit of the filing date of PCT Application PCT/US00/02194, filed Jan. 27, 2000 which, in turn, claims the benefit of the filing date of Provisional Application Ser. No. 60/117,854, filed Jan. 29, 1999.

FIELD OF THE INVENTION

This invention relates to a process to produce asymmetric hollow fiber membranes from perfluorinated thermoplastic polymers, and to the membranes so produced.

BACKGROUND OF THE INVENTION

Hollow fiber membranes are used in a wide variety of applications. Ultrafiltration hollow fiber membranes are used to separate proteins and other macromolecules from aqueous solutions. Ultrafiltration membranes are usually rated in terms of the size of the solute they will retain. Typically, ultrafiltration membranes can be produced to retain dissolved or dispersed solutes of from about 1000 Daltons to about 1,000,000 Daltons. They can be rated by Molecular Weight Cutoff, which is the molecular weight expressed in Daltons, a unit of molecular mass, at which a stated per cent of the feed concentration of the solute being processed is retained or rejected by the membrane. Manufacturers usually set the stated per cent at 90% to 95%. Ultrafiltration membranes can also be designated by their average or nominal pore size. The nominal or average pore size of typical ultrafiltration membranes is in the range of about 2 nanometers to about 50 nanometers.

Hollow fiber membranes are also used as membrane contactors, typically for degassing or gas absorption applications. Contactors bring together two phases, i.e., two liquid phases, or a liquid and a gas phase for the purpose of transferring a component from one phase to the other. A common process is gas-liquid mass transfer, such as gas absorption, in which a gas or a component of a gas stream is absorbed in a liquid. Liquid degassing is another example, in which a liquid containing dissolved gas is contacted with an atmosphere, a vacuum or a separate phase to remove the dissolved gas. In an example of conventional gas absorption, gas bubbles are dispersed in an absorbing liquid to increase the gas/liquid surface area and increase the rate of transfer of the species to be absorbed from the gas phase. Conversely, droplets of liquid can be sprayed or the liquid can be transported as a thin film in counter-current operation of spray towers, packed towers, etc. Similarly, droplets of an immiscible liquid can be dispersed in a second liquid to enhance transfer. Packed columns and tray columns have a deficiency as the individual rates of the two phases cannot be independently varied over wide ranges without causing flooding, entrainment, etc. If however, the phases are separated by a membrane, the flow rates of each phase can be varied independently. Furthermore, all the area is available, even at relatively low flow rates. Due to these advantages, hollow fiber membranes are increasingly being used in contactor applications.

Hydrophobic microporous membranes are commonly used for contactor applications with an aqueous solution that does not wet the membrane. The solution flows on one side of the membrane and a gas mixture at a lower pressure than the solution flows on the other. Pressures on each side of the membrane are maintained so that the liquid pressure does not overcome the critical pressure of the membrane, and so that the gas does not bubble Into the liquid. Critical pressure, the pressure at which the solution will intrude into the pores, depends directly on the material used to make the membrane, inversely on the pore size of the membrane, and directly on the surface tension of the liquid in contact with the gas phase. Hollow fiber membranes are primarily used because of the ability to obtain a very high packing density with such devices. Packing density relates to the amount of useful filtering surface per volume of the device. Also, they may be operated with the feed contacting the inside or the outside surface, depending on which is more advantageous in the particular application. Typical applications for contacting membrane systems are to remove dissolved gases from liquids, "degassing"; or to add a gaseous substance to a liquid. For example, ozone is added to very pure water to wash semiconductor wafers.

Porous contactor membranes are preferred for many applications because they will have higher mass transfer than nonporous membranes. For applications with liquids having low surface tensions, smaller pore sizes will be able to operate at higher pressures due to their resistance to intrusion. Non-porous contactor membranes are preferred in cases where the liquid vapor pressure is high, or where high temperature operation increases the vapor pressure. In these cases, evaporation through a porous membrane may result in substantial liquid loss. Non-porous membranes may also be preferred in high pressure applications, where intrusion of a porous membrane would be a problem. Furthermore, in applications where a liquid phase has a surface tension of less than about 20 mN/m, (milliNewtons per meter), a nonporous membrane would be advantageous as porous membranes would be intruded by such low surface tension liquids.

A hollow fiber porous membrane is a tubular filament comprising a outer diameter, an inner diameter, with a porous wall thickness between them. The inner diameter defines the hollow portion of the fiber and is used to carry fluid, either the feed stream to be filtered through the porous wall, or the permeate if the filtering is done from the outer surface. The inner hollow portion is sometimes called the lumen.

The outer or inner surface of a hollow fiber membrane can be skinned or unskinned. A skin is a thin dense surface layer integral with the substructure of the membrane. In skinned membranes, the major portion of resistance to flow through the membrane resides in the thin skin. The surface skin may contains pores leading to the continuous porous structure of the substructure, or may be a non-porous integral film. Asymmetric refers to the uniformity of the pore size across the thickness of the membrane; for hollow fibers, this is the porous wall of the fiber. Asymmetric membranes have a structure in which the pore size is a function of location through the cross-section. Another manner of defining asymmetry is the ratio of pore sizes on one surface to those on the opposite surface.

Manufacturers produce membranes from a variety of materials, the most general class being synthetic polymers. An important class of synthetic polymers are thermoplastic polymers, which can be flowed and molded when heated and recover their original solid properties when cooled. As the conditions of the application to which the membrane is being used become more severe, the materials that can be used becomes limited. For example, the organic solvent-based solutions used for wafer coating in the microelectronics industry will dissolve or swell and weaken most common polymeric membranes. The high temperature stripping baths in the same industry consist of highly acidic and oxidative compounds, which will destroy membranes made of common polymers. Perfluorinated thermoplastic polymers such as poly(tetrafluoroethylene-co-perfluoro(alkylvinylether)) (Poly(PTFE-CO-PFVAE)) or poly(tetrafluoroethylene-co-hexafluoropropylene) (FEP) are not adversely affected by severe conditions of use, so that membranes made from these polymers would have a decided advantage over ultrafiltration membranes made from less chemically and thermally stable polymers. These thermoplastic polymers have advantage over poly(tetrafluoroethylene) (PTFE), which is not a thermoplastic, that they can be molded or shaped in standard type processes, such as extrusion. Using the process of the present invention, hollow fiber membranes can be produced at smaller diameters than possible with PTFE. Smaller diameters are useful in compact equipment, such as in aerospace applications.

Being chemically inert, the poly (PTFE-CO-PFVAE) and FEP polymers are difficult to form into membranes using typical solution casting methods. They can be made into membranes using the Thermally Induced Phase Separation (TIPS) process. In one example of the TIPS process a polymer and organic liquid are mixed and heated in an extruder to a temperature at which the polymer dissolves. A membrane is shaped by extrusion through an extrusion die, and the extruded membrane is cooled to form a gel. During cooling the polymer solution temperature is reduced to below the upper critical solution temperature. This is the temperature at or below which two phases form from the homogeneous heated solution, one phase primarily polymer, the other primarily solvent. If done properly, the solvent rich phase forms a continuous interconnecting porosity. The solvent rich phase is then extracted and the membrane dried.

An advantage for contacting applications is that the very low surface tension of these perfluorinated polymers allows use with low surface tension liquids. For example, highly corrosive developers used in the semiconductor manufacturing industry may contain surface tension reducing additives, such as surfactants. These developers could not be degassed with typical microporous membranes because the liquid would intrude the pores at the pressures used and permeate, causing solution loss and excess evaporation. In addition, liquid filling the pores would greatly add to the mass transfer resistance of gas transport. U.S. Pat. No. 5,749,941 describes how conventional hollow fiber membranes of polypropylene or polyethylene cannot be used in carbon dioxide or hydrogen sulfide absorption into aqueous solutions containing an organic solvent without the use of an solution additive to prevent leakage. While PTFE membranes would work in these applications, presumably because of their lower surface tension, they are difficult to process into hollow fibers. The membranes of the present invention are made from polymers having similar surface tension properties to PTFE and are more readily manufactured into small diameter hollow fiber membranes.

Ultrafiltration membranes are primarily manufactured as skinned asymmetric membranes because this structure gives the advantage of high permeation rates for the small pores needed for efficient retention of solutes. In skinned asymmetric membranes, the pores required for solute retention are produced only in the surface skin. This is done to offset the high resistance to flow inherent to pores of the diameter common to ultrafiltration membranes by reducing the length of the pores, i.e., the thickness of the skin. This is a significant difference from microporous membranes, which are usually not skinned, and usually have a symmetric pore structure through the membrane cross-section. The larger pore size of microporous membranes is sufficient to have economically feasible permeation rates even for membranes with a uniform pore size through the total membrane thickness. Membranes having the pore size of ultrafiltration membranes and having a symmetric pore size through the membrane thickness would have very low permeation rates. Similarly, contactor membranes with pore sizes of the same size as ultrafiltration membranes would have increased mass transfer resistance unless they were made as asymmetric skinned membranes, where the small pores were only in the skin.

Asymmetric skinned hollow fibers are primarily used with the skin on the inner lumen. The present invention describes such membranes and a process to produce them. The process described has also been adapted to produce an asymmetric hollow fiber membrane with an outside skin. The inventors of this method found that using very short air gaps, the distance from the exit of the die tip to the cooling bath surface, they were able to control the thickness of the skin that formed when solvent evaporated from the outer surface. Previous microporous poly(PTFE-CO-PFVAE) and FEP membranes made from the TIPS method required extrusion through an air gap. poly(PTFE-CO-PFVAE) and FEP membranes made by the TIPS process are disclosed in U.S. Pat. Nos. 4,902,45; 4,906,377; 4,990,294; and 5,032,274. In the U.S. Pat. Nos. 4,902,456 and 4,906,377, the membranes have a dense surface with either intervals of crack-like openings or pores, either singly, or as a series of several pores. The U.S. Pat. Nos. 4,990,294, and 5,032,274 disclose using a coating of the dissolution solvent on the shaped membrane as it exits the die. In one embodiment, the membrane in a sheet form is stretched in the transverse direction. It was found that the rapid evaporation of the solvent at the high extrusion temperatures gave skinning and poor control of the surface porosity. To overcome the skinning problems, a solvent Fit coating method and post-stretching were employed by previous inventors. In the present invention, the problem of a dense skin and crack-like openings was overcome by the careful control of the air gap at a very short distance, preferably not more than about 0.5 inch, so that a thin skin with uniform surface structure was formed.

It would therefore be desirable to have asymmetric hollow fiber membrane that could operate with very corrosive liquids and gases, and could be used with liquids having surface tensions greater than about 20 mN/m.

SUMMARY OF THE INVENTION

This invention provides for the first time for an asymmetric hollow fiber porous membranes, skinned on at least one surface, more specifically, ultrafiltration and contactor membranes, from perfluorinated thermoplastic polymers, more specifically poly(tetrafluoroethylene-co-perfluoro (alkylvinylether)) (poly(PTFE-CO-PFVAE)) or poly (tetrafluoroethylene-co-hexafluoropropylene) (FEP). These membranes are capable of operating in severe chemical environments with no apparent extractable matter being released. These membranes have low surface tension properties, which allows them to be used as contactors with fluids having surface tension lower than water.

A process to produce these membranes is provided. The process is based on the Thermally Induced Phase Separation (TIPS) method of making porous structures and membranes. A mixture of polymer pellets, preferably ground to a size smaller than that typically supplied by the manufacturer, to about 100 to about 1000 micron size, preferably to about 300 microns, and an solvent, such as chlorotrifluoroethylene oligimer, is first mixed to a paste or paste-like consistency. The polymer comprises between approximately 12% to 75%, preferably 30% to 60%, by weight of the mixture. The solvent is chosen so the membrane formation occurs by liquid-liquid, rather than solid-liquid phase separation when the solution is extruded and cooled. Preferred solvents are saturated low molecular weight polymers of chlorotrifluoroethylene. A preferred solvent is HaloVac® 60 from Halocarbon Products Corporation, River Edge, N.J. Choice of the solvent is dictated by the ability of the solvent to dissolve the polymer when heated to form an upper critical solution temperature solution, but not to excessively boil at that temperature. Fiber extrusion is referred to as spinning and the extruded fiber length from the die exit to the take-up station is referred to as the spin line.

The paste is metered into a heated extruder barrel where the temperature raised to above the upper critical solution temperature so that dissolution occurs. The homogeneous solution is then extruded through an annular die directly into a liquid cooling bath with no air gap. The liquid cooling bath is maintained at a temperature below the upper critical solution temperature of the polymer solution, The preferred bath liquid is not a solvent for the thermoplastic polymer, even at the extrusion temperature. Upon cooling, the heated and shaped solution undergoes phase separation and a gel fiber results. The die tip is slightly submerged for vertical spinning, i.e., the spin line falls downward, in the direction of a freely falling body. For horizontal spinning, where the spin line exits directly in the horzontal attitude, and is maintained more or less in that plane until at least the first guide roll, a specially design die is used. The die is firmly positioned against an insulated wall with the die tip penetrating through a opening having a liquid-tight seal in the insulator wall. A trough for cooling liquid flow is placed in a recess in the opposite side of the insulating wall, in a manner that will maintain the die nose outlet in a submerged condition. Cooling liquid flows in the trough and overflows in a region of the trough of lesser depth, keeping the die nose outlet submerged with a flow of cooling liquid. In both the vertical and horizontal methods, a booster heater and temperature control means is used to briefly raise the solution temperature at the die tip to prevent premature cooling. In a subsequent step, the dissolution solvent is removed by extraction and the resultant hollow fiber membrane is dried under restraint to prevent membrane shrinkage and collapse. Optionally the dried fiber may be heat set at 200° C. to 300° C.

U.S. Patent Application 60/117,852, filed Jan. 29, 1999, the disclosure of which is incorporated by reference, describes a process for to manufacturing hollow fiber microporous membranes using a submerged die tip to prevent solvent from flashing off from the outer diameter. Flashing caused an increase in the polymer content at that surface and a dense skin to form. This was deleterious to microporous membrane properties. In that process, polymer solutions of from about 12% to about 35% were used in the membrane making process. It was found that at solutions of higher than about 35%, the porosity was too low to produce a useful microporous membrane. Also, in that process, a liquid was co-extruded in the lumen of membrane while the hollow fiber microporous membrane was extruded. This lumen fluid was necessary to control the porosity of the hollow fiber membrane by preventing solvent from flashing from the extrudate surface and thereby increasing the polymer concentration at the surface and subsequent skin formation.

In the present invention, controlled evaporation of solvent from at least one surface of the hollow fiber as it exits the die tip is combined with higher polymer solids solutions and the submerged extrusion process to produce asymmetric hollow fiber porous membranes, skinned on at least one surface, more specifically, ultrafiltration and contactor membranes, from perfluorinated thermoplastic polymers. It was found that polymer concentrations required to make suitable membranes for the purposes described were from about 12% to about 75%, with preferred concentrations from about 30% to about 60%. Furthermore, in a preferred embodiment in which the skin is formed on the inner surface, the lumen liquid was replaced with a fluid, preferably a gas, that does not prevent solvent evaporation. Without the presence of the lumen liquid of the above invention, the superheated solvent evaporates inside the lumen as soon as it emerges from the die. The loss of solvent causes a superficial increase in solids concentration on the lumen surface. As the melt is quenched, a very thin skin is formed on the lumen surface, while the rest of the membrane forms a microporous structure due to its being submerged in a quenching bath which prevents the porogen from flashing off the outer surface and prevents the formation of a skin on the outer surface.

To produce a asymmetric skinned hollow fiber membrane with the skin on the outer surface, the process described above is adapted so the lumen is filled with a fluid to prevent evaporation and the outer surface is exposed to the atmosphere in a very short air gap before entering the cooling bath.

DETAILED DESCRIPTION OF THE EMBODIMENT OF THE INVENTION

Figure 1:
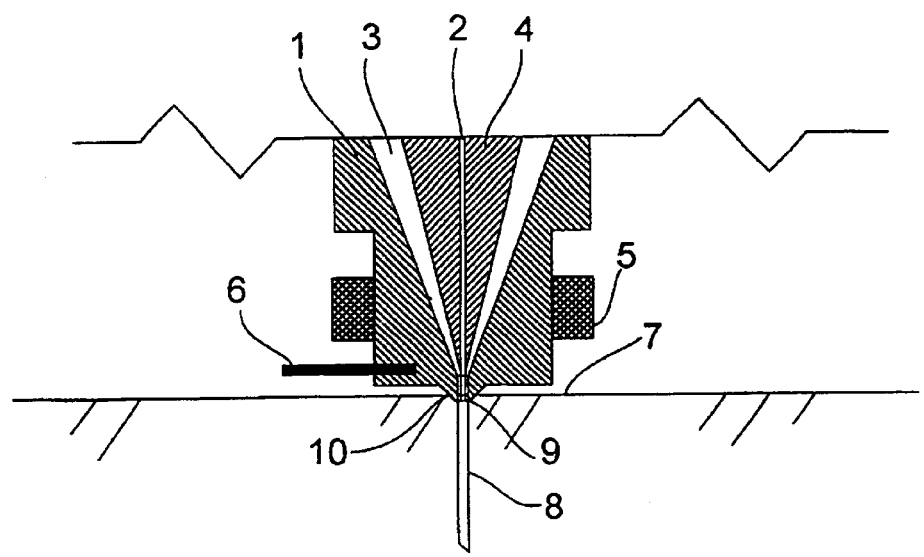
FIG. 1 is a flow diagram of the process of this invention with vertical extrusion.

A person of ordinary skill in the art of making porous membranes will find it possible to use the teachings of the present invention to produce asymmetric hollow fiber porous membranes, more specifically, ultrafiltration and contactor membranes, from perfluorinated thermoplastic polymers, more specifically poly(tetrafluoroethylene-co-perfluoro(alkylvinylether))(poly(PTFE-CO-PFVAE)) or poly(tetrafluoroethylene-co-hexafluoropropylene)(FEP), and blends thereof, which are dissolved in a solvent to give a solution having an upper critical solution temperature, and which when the solution is cooled, separates into two phases by liquid-liquid phase separation. PFA Teflon® is an example of a poly(tetrafluoroethylene-co-perfluoro(alkylvinylether)) in which the alkyl is primarily or completely the propyl group. FEP Teflon® is an example of poly(tetrafluoroethylene-co-hexafluoropropylene). Both are manufactured by DuPont. Neoflon™ PFA (Daikin Industries) is a polymer similar to DuPont's PFA Teflon®. A poly(tetrafluoroethylene-co-perfluoro(alkylvinylether)) polymer in which the alkyl group is primarily methyl is described in U.S. Pat. No. 5,463,006. A preferred polymer is Hyflon® poly(PTFE-CO-PFVAE) 620, obtainable from Ausimont USA, Inc., Thorofare, N.J.

With the poly(PTFE-CO-PFVAE). PFA, and FEP polymers, saturated low molecular weight polymers of chlorotrifluoroethylene have been found to be useful solvents. A preferred solvent is HaloVac® 60, Halocarbon Products Corporation, River Edge, N.J.

Fiber Spinning Compositions

A paste or dispersion of polymer and solvent is made by mixing the desired amount of weighed solvent to pre-weighed polymer in a container. The polymer has either been obtained in the desired size or has been previously reduced to that desired size, approximately 50 to 1000 micron size, preferably about 300 micron size, by a suitable grinding process. One polymer which is available in this size range is HYFLON® MFA 620 available from Ausimont USA, Inc of Thorofare, N.J. This size range is preferred as larger size particles do not completely dissolve in the preferred heating step without the requirement of additional heating time, and smaller particles require more expensive grinding which increases the cost of the process. The polymer comprises between approximately 12% to 75%, preferably 15% to 60% of the mixture.

An example of a saturated low molecular weight polymers of chlorotrifluoroethylene is HaloVac® 60. (Halocarbon Products Corporation). Choice of the solvent is dictated by the ability of the solvent to dissolve the polymer when heated to form an upper critical solution temperature solution, but not to excessively boil at that temperature. When dissolution takes place at a temperature well above the boiling point of the solvent, bubbles form in the extrudate and cause spin line breakage. The solvent need not be a single pure compound, but may be a blend of molecular weights, or copolymer ratios, of low molecular weight polymers of chlorotrifluoroethylene. Such blends can be adapted to balance solubility with suitable boiling point characteristics.

Dissolution and Extrusion

The paste or dispersion is metered into the heated mixing zone of a conventional twin screw extruder and heated to a preferred temperature of about 270° C. to about 320° C., with a more preferred range of 285° C. to 310° C., optionally under an inert atmosphere, such as nitrogen, to prevent to degradation of the solvent at these temperatures. The temperature is dependent on the melting temperature of the polymer being used. The extruder conveys the heated solution to an in-line heated metering pump, which feeds the solution to the annular die and controls the rate of extrusion. Optional in-line filters can be used, if required.

Fiber Extrusion

Hollow fiber membrane production presents difficulties not encountered with membrane production such as sheet membrane where the membrane is supported as is solidifies. In the case of hollow fiber production at very high temperatures, these problems are magnified. Hollow fibers are made by extruding a polymer solution or dispersion through the annular space of a die made of two concentric tubes. The inner tube carries a liquid or gas, the lumen fluid, which maintains the inner diameter defining the lumen during solidification, and depending on whether the lumen fluid is a liquid or a gas, controls the formation of a skin on the inner surface of the hollow fiber membrane. In operation, the polymer solution is co-extruded with the lumen fluid into a liquid bath. In the thermally induced phase separation method of this invention, the bath liquid is maintained at a temperature below which phase separation occurs for the polymer solution being used. The shaped solution cools, phase separation takes place, and the fiber solidifies. Unlike flat sheet membranes, which are coated or extruded onto a roll or a web carrier, or tubular membranes, which are formed on the inner or outer surface of a mandrel, extruded hollow fibers are not supported while they are solidifying. Since the extruded solution is not supported, the forces that transport the fiber through the cooling bath are operating directly on the shaped solution as it solidifies. If the forces are too large, the fiber will pull apart.

For the fibers of the present invention, there are two inter-related problems that had to be overcome in order to have a useful process. These are the need to have a asymmetric skinned membrane, and to be able to extrude a solution that would have sufficient strength to be continuously produced at a practical rate. Perfluorinated thermoplastics melt at high temperatures, approximately 260° C.–310° C., and are difficult to dissolve. Few solvents are known and even the saturated low molecular weight polymers of chlorotrifluoroethylene found useful have limitations. For these solvents, higher molecular weight species have higher boiling points. It is commonly accepted that in a TIPS process that the boiling point of the solvent should be greater than the polymer melting temperature by 25° C.–100° C. and should have a low volatility at the extrusion temperature. (Lloyd, D. R. et al, J. Membrane Sci. 64 1–11 (1991)). However, saturated low molecular weight polymers of chlorotrifluoroethylene with boiling points greater than about 290° C. are not practical solvents for these polymers because they dissolve the perfluorinated thermoplastics with difficulty. Therefore, a method had to be developed to use solvents having boiling points lower or near to the melting temperature of the polymer.

A preferred structure for the hollow fiber membranes of the present invention is with one surface to be skinned, preferably the inner surface. This structure will maximize permeation. In order to obtain a hollow fiber membrane having only the inner surface skinned, outer surface formation must be controlled so as to produce a porous, preferably unskinned outer surface. At these temperatures, the solvent is very volatile and if an air gap is used, rapid loss of solvent from to outer surface in the air gap will increase the polymer concentration at the fiber surface and result in an outer skin. To prevent outer skin formation from rapid evaporation of the solvent, the die outlet is submerged in the cooling bath.

Submerged extrusion, although seemingly simple, is actually very difficult to achieve practically. In TIPS processing, heated extrudate passes through an air gap before contacting the cooling surface or bath liquid. The air gap, the distance from the outlet of the die to the cooling or quenching surface, serves the very important function of allowing the melt to draw. Draw can be described by the ratio of the membrane wall thickness to the annular space of the die. The air gap allows the melt to accelerate (drawing) and to be taken up at a high and economical rate. For hollow fiber submerged extrusion, however, only a low draw ratio can be tolerated because the extruded fiber rapidly cools and solidifies as it exits the die into the cooling bath, and becomes resistant to drawing. Not being fully solidified, the fiber has a strong tendency to break. Therefore, it is necessary to spin the fibers with a low draw ratio.

In this invention, submerged extrusion was perfected to eliminate the air gap. First, to sidestep the drawing dilemma, a hollow fiber die was made with an unusually narrow die gap of about 350–400µ, which defines the wall thickness. This is very close to the dimension of the final fiber so that minimal drawing is required. The die was designed and machined so that only the tip, about 1/16 of an inch, made contact with the quench liquid. This modification is important to the success of this technique in that it allows for control of the extrudate temperature. Since the quench liquid has a much lower temperature than the die body, submerging a conventional die would drop the temperature of the die to the point that the solution loses its ability to flow. Even with just the tip submerged, there was a decrease in the temperature of the die tip. A microthermocouple and a strategically located booster heater were used to control the temperature of the die tip and to raise the solution temperature at the die tip. The exact amount of contact of the die tip with the cooling will in general depend, for example, on the design of the extrusion system being used and the temperature of the cooling bath. Long die tips will require more booster heater capacity and more complex control systems. Shorter die tips will increase the difficulty of machining the tip and may be more difficult to position. A skilled practitioner will be able to adapt these teachings to accommodate their combination of equipment and materials.

Figure 2:
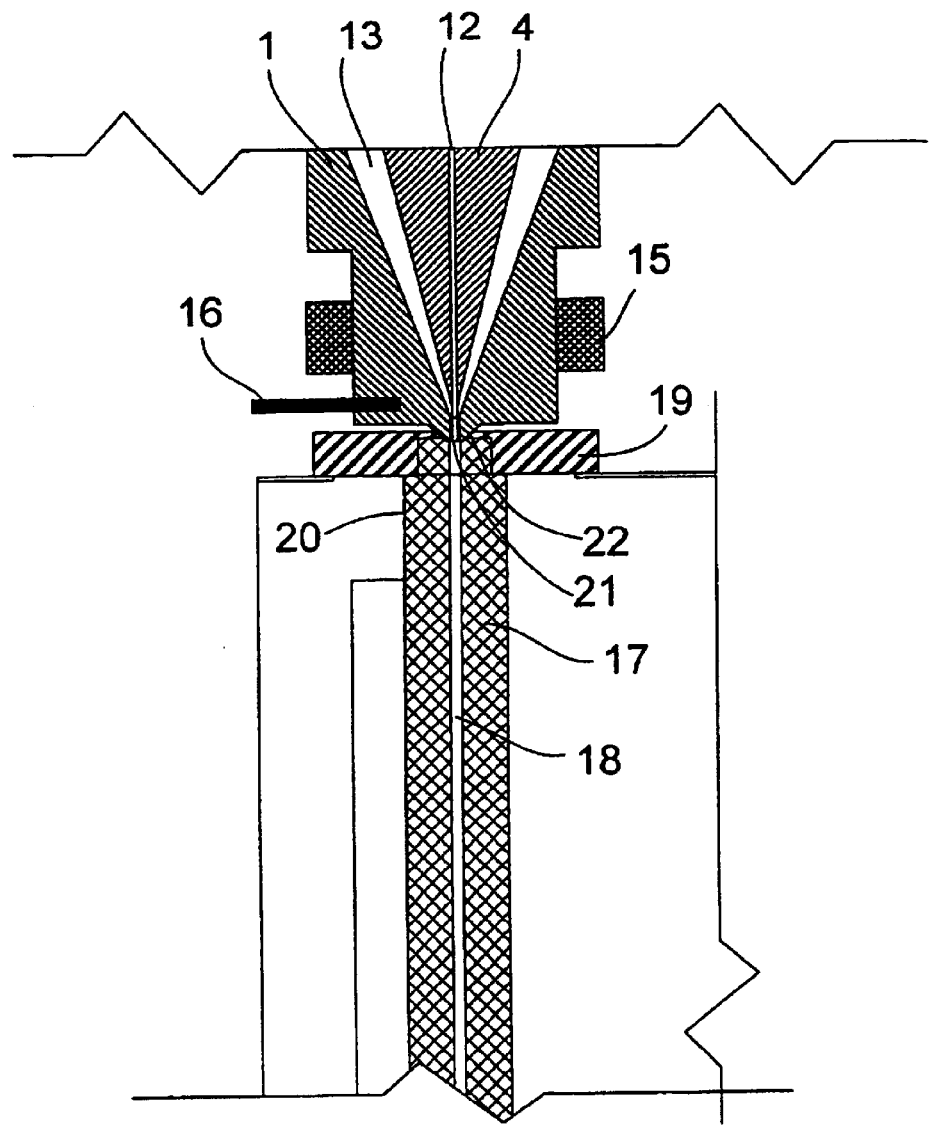
FIG. 2 is a flow diagram of the process of this invention with horizontal extrusion.

Fiber can be extruded in either of two attitudes, horizontally or vertically, as shown in FIGS. 1 and 2. The solution is metered through the annular die by the metering pump at a volumetric rate that approximately matches the take up rate of the spin line. This is necessary to prevent any significant drawdown of the fiber which will cause breakage of the weak extrudate. The inner and outer diameter, and the resulting annular space are set by the requirements for the final fiber. A wall thickness of from 100 microns to 250 microns, preferably 150 microns to 200 microns, will give a useful fiber. Spin line take-up rates are dependent on the fiber dimensions and extrusion rate. Rates of from approximately 10 to approximately 200 feet per minute can be used, with a preferred rate being approximately 25 to 100 feet per minute.

During fiber extrusion the inner diameter of the die is filled with a continuous flow of fluid to prevent the fiber lumen from collapsing. Careful control of the lumen fluid flow rate is required to prevent uncontrolled variations in fiber dimensions. The fluid flow plays an important role in the control of the skinned surface in conjunction with the submerged method of extrusion. While the following explanation is not given to be limiting to the invention, it is presented to describe the formation of the membrane skin. In a preferred method, the solvent is superheated in the die, just prior to exit, and so the solvent in the exiting fiber is at a temperature above its boiling point. In the inner diameter, the atmosphere quickly approaches or reaches supersaturation or saturation due to evaporation of solvent, depending on the heat transfer conditions at that point. The polymer concentration of the surface is increased due to the loss of solvent and in the subsequent phase separation forms a skin. It is desirable to have the skin as thin and uniform as possible, because resistance to permeation through the membrane is primarily due to the skin, and it is well-known that resistance is inversely proportional to skin thickness. It can be appreciated that the faster the skin is formed, the thinner it will be. This is because the initial skin will slow down further evaporation and reduce the increase of polymer solids at or near the surface. However, if evaporation continues, more polymer solids will be concentrated at or near the surface, and a thicker skin will result.

Submerged extrusion as taught in the present invention is important to control skin thickness because the instantaneous cooling reduces further boiling and evaporation after the initial skin formation. This not only controls final skin thickness, but prevents defects that may be caused by rapid evaporation or boiling under the formed skin, which could cause bubbles or skin perforations. Furthermore, since the preferred membrane has a skin on its inner surface and a porous surface on its outer surface, submerged extrusion results in a porous outer surface, and preferably an asymmetric structure, which maximizes overall permeability.

Control of skin formation can be enhanced by the method in which the lumen gas is employed. Control of gas temperature will effect the saturation or supersaturation limit in the lumen atmosphere. Ambient temperature or heated lumen gas is preferred, but cooled gases may be employed if needed. The type of gas can be used to control the rate of evaporation, as it is well-known that lower molecular weight gases, such as helium, have higher mass transfer coefficients than higher molecular weight gases at equal conditions of pressure and temperature. Gas mixtures can also be used to control evaporation.

A preferred method of controlling gas flow is with a differential pressure controller that maintains the pressure in the lumen at a constant value, despite transient variations to the fiber during the extrusion process.

The die is comprised of a standard cross-head die, to which is attached a die nose. The die has two temperature control zones. The crosshead portion of the die is kept at 270° C. to 320° C., with preferred temperature range being 280° C. to 290° C. The die nose, which encompasses the die outlet, is controlled separately to a range of 290° C. to 320° C., preferably to 300° C. to 310° C. The die nose heated zone briefly raises the solution temperature to near or above the boiling point of the solvent.

FIG. 1 illustrates the die nose used for vertical fiber spinning. The solution is introduced to circular inlet 3 from the cross-head die and is transported to die exit 9. Lumen fluid is introduced to the die nose at inlet 2, and exits at the die exit. Heater 5 maintains the solution in a fluid form. Temperature sensor 6 is used with a temperature controller to maintain heater 5 at a determined temperature above the separation temperature of the solution. Die tip 9 is submerged in cooling bath 7. Gel membrane hollow fiber 8 exits the die nose through die exit 9, with the lumen gas filling the inner diameter of the fiber.

FIG. 2 illustrate the die nose used for horizontal fiber spinning. The solution is introduced to circular inlet 13 from the cross-head die and is transported to die exit 21. Lumen gas is introduced to the die nose at inlet 12 and exits at the die exit. Heater 15 maintains the solution in a fluid form. Temperature sensor 16 is used with a temperature controller to maintain heater 15 at a determined temperature above the separation temperature of the solution. Die tip 22 penetrates die nose/cooling bath insulator wall 19 and contacts cooling bath fluid 7 held in cooling bath trough 20. Gel membrane hollow fiber 18 exits the die tip through die exit 21, with the lumen gas filling the inner diameter of the fiber.

For vertical extrusion, the die tip is positioned so that the exiting gel fiber does not pass through an air gap before contacting the cooling bath. A preferred position has approximately 1.6 millimeter (¹⁄₁₆ inch) of the die submerged as represented in FIG. 1. For horizontal fiber spinning, the die is firmly positioned against an insulated surface as shown in FIG. 2. The die tip penetrates through a opening having a liquid-tight seal in the insulator. A trough for cooling liquid flow is placed in a recess in the opposite side of the insulating seal, in a manner that will maintain the die nose outlet in a submerged condition. The trough may be permanently fixed or retractable. The trough comprises a longer length of a depth, and a shorter length of less depth, which butts against the insulator in the recess. Optionally, the trough can be of a single depth with for example, pumping means to remove overflow cooling fluid. Cooling liquid flows in the trough and overflows the region of the trough of lesser depth, keeping the die nose outlet submerged with a flow of cooling liquid. Optionally, the trough may be placed to allow a small flow of cooling liquid between the trough end and the insulator surface.

Cooling Bath

The cooling bath lowers the temperature of the extruded fiber to below the upper critical solution temperature to cause phase separation. The bath liquid can be any liquid having a boiling point high enough to prevent bubbles from forming on the fiber exiting the die, and not adversely affecting the surface pore forming process. The bath temperature can be from 25° C. to 230° C., with a preferred range being 50° C. to 150° C.

The bath liquid can be any liquid that does not boil at the cooling temperature, or at the point where the heated extrudate enters the cooling bath, or interact with the fiber to cause a skin to form, or to dissolve or swell the polymer at the cooling bath temperature. Examples of preferred liquids are mineral oil, dimethylsilicone oil and di-octyl pthalate. Other di-substituted pthalates may be used.

Extraction and Drying

The gel fiber is then introduced into a liquid extraction bath of a liquid that will remove the solvent without substantially softening, weakening, or dissolving the fiber. Suitable extraction solvents include 1,1 dichloro-1-fluorethane, (Genesolve 2000 Allied-Signal, NJ), 1,1,2 trichlorotrifluoroethane (Freon® TF, DuPont), hexane or similar. Extraction is usually done at from about 20° C. to about 50° C. to minimize the effect of the extracting liquid on the fiber. The extracted fiber is dried under restraint to prevent shrinkage, as on a cylindrical core, at from 20° C. to 50° C. Optionally, the fiber is then heat set at 200° C. to 300° C.

The advantage of the submerged extrusion method is that it can produce hollow fiber membrane continuously in practical lengths. Perfluorinated thermoplastic hollow fiber membranes made by prior art methods break easily during extrusion and practical lengths cannot be collected.

Figure 3:
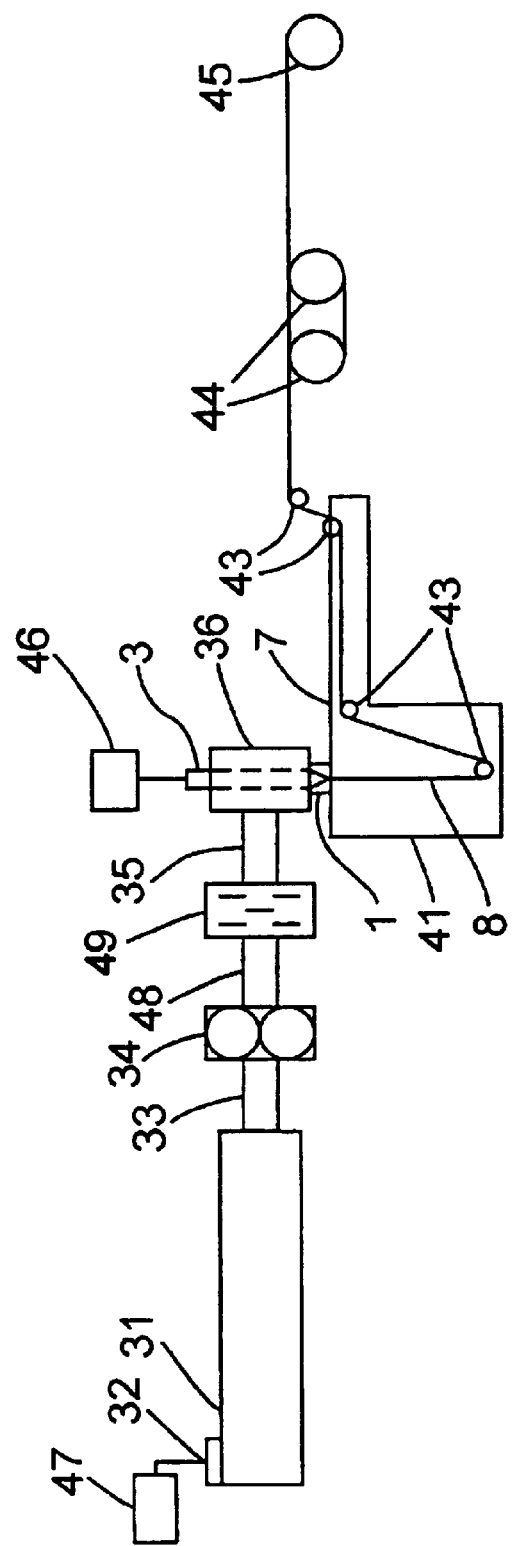
FIG. 3 is a drawing of the die used in vertical fiber spinning.

FIG. 3 illustrates a typical process for vertical spinning to produce the hollow fibers of the invention. The polymer/solvent paste-like mixture is introduced into a heated barrel extruder 31 through inlet 32, by means of a pumping system 47, for example, a progressive cavity pump. A solution is formed is formed in the heated barrel of extruder 31. Extruder 31 conveys the heated solution through conduit 33 into melt pump 34 which meters the solution, and then through conduit 35 to cross head die 36. Optionally, the solution is conveyed from extruder 31 through conduit 33 into melt pump 34, and then through conduit 48 to solution filter 49, and then through conduit 35 to cross head die 36.

The solution passes through the cross head die 36 and into the die nose 1 where the solution is formed into a hollow fiber shape. The lumen gas is introduced from die mandrel 38 to the inner diameter of the hollow fiber solution exiting from the die. The lumen gas is supplied to die mandrel 38 by means of lumen gas supply means 46.

For vertical fiber spinning, the solution with lumen gas is extruded from die nose 1 vertically with no air gap into cooling bath fluid 7 contained in cooling bath 41 where the solution is cooled to effect the microphase separation of polymer and solvent into a gel membrane hollow fiber 8. The gel membrane hollow fiber 8 is guided through the cooling bath 41 by guide rollers 43 and is removed from the cooling bath 41 by Godet rolls 44. The gel membrane hollow fiber 8 is removed from the Godet rolls 44 by cross winder 45.

Figure 4:
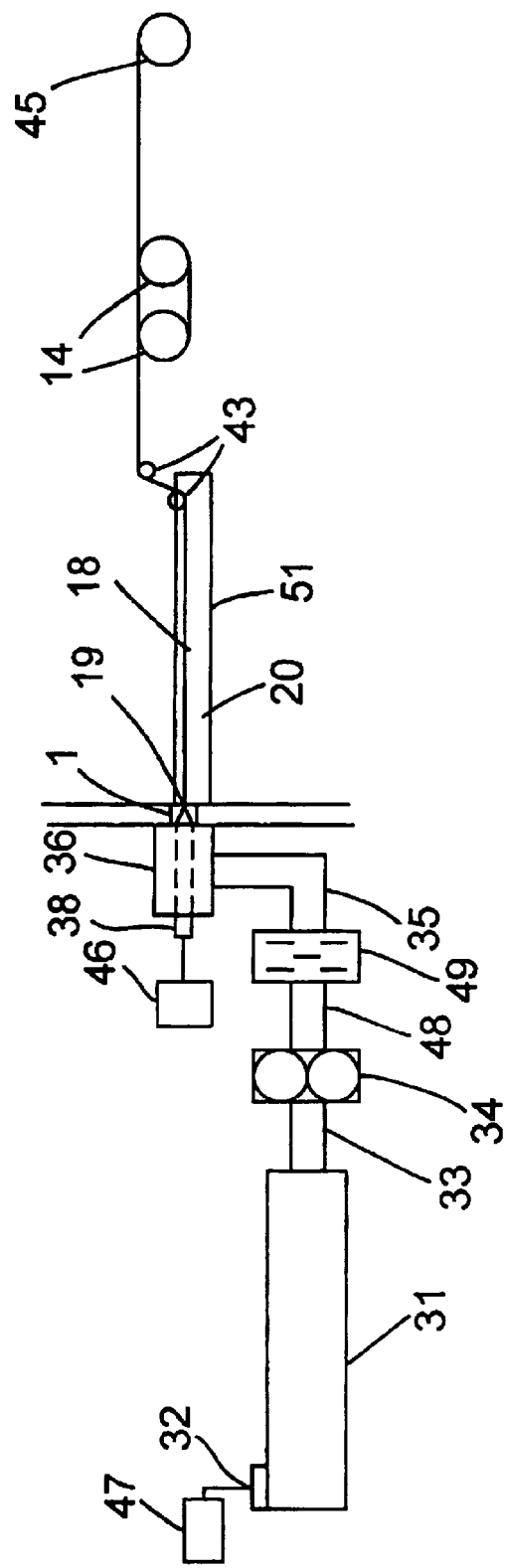
FIG. 4 is a drawing of the die used in horizontal fiber spinning.

FIGS. 4 illustrates a typical process for horizontal spinning to produce the hollow fibers of the invention. The polymer/solvent paste-like mixture is introduced into a heated barrel extruder 31 through inlet 32, by means of a pumping system 47, for example, a progressive cavity pump. A solution is formed in the heated barrel of extruder 31. Extruder 31 conveys the heated solution through conduit 33 into melt pump 34 which meters the solution, and then through conduit 35 to cross head die 36. Optionally, the solution is conveyed from extruder 31 through conduit 33 into melt pump 34, and then through conduit 48 to solution filter 49, and then through conduit 35 to cross head die 36.

The solution passes through the cross head die 36 and into the die nose 1 where the solution is formed into a hollow fiber shape. The lumen gas is introduced from die mandrel 38 to the inner diameter of the hollow fiber solution exiting from the die. The lumen fluid is supplied to die mandrel 38 by means of lumen gas supply means 46.

For horizontal fiber spinning, the solution with lumen gas is removed from the die nose 1 through the die/cooling bath insulator wall 19 with no air gap into cooling bath fluid 20 contained in cooling bath 51 where the solution is cooled to effect the microphase separation of polymer and solvent into a gel membrane hollow fiber 18.

The gel membrane hollow fiber 18 is guided through the cooling bath 51 by guide rollers 43 and is removed from the cooling bath 51 by Godet rolls 44. The gel membrane hollow fiber 18 is removed from the Godet rolls 44 by cross winder 45.

Solvent is then removed from the gel fiber by extraction with a solvent that will not significantly weaken or deleteriously affect the hollow fiber membrane. The fiber is then dried under restraint to minimize shrinkage. Optionally, the fiber may be stretched in the longitudinal direction. Optionally, the fiber may be heat set.

While the preferred product of this invention is a hollow fiber membrane with the skin on the inner diameter, there may be contactor applications where it is more desirable to have the skin on the outer surface. The outer surface skinned membrane would be more suitable for applications where the liquid phase is on the shell side of the fibers. For the case of an outer skinned membrane, a skilled practitioner would adapt the present preferred method to have a liquid or other suitable fluid co-extruded in the lumen, and allow a controlled flash off of solvent from the outer surface. The amount of flashed-off solvent would, for example, be controlled with a combination of extrusion rate and the distance between the exit of the extruded fiber from the die tip and the entrance of the fiber into the cooling bath. A air contact time, the time the extruded fiber outer surface is in the atmosphere between the extruder outlet and the cooling bath surface, of less than about 0.05 secods is preferred, with an air contact time of less than about 0.02 seconds most preferred.

Characterization Methods

Flow Rate Test

Two strands of fiber as loops were fit into a ¼"polypropylene tubing about 1" long. A hot melt gun is used to force hot melt glue through the open end of the tubing to pot the fibers. Normally, the glue does not fill up all the spaces between the fibers. To complete the potting, hot melt glue is applied to the other end of the tube. The length of the fibers, from the end of the potting to the loop, should be about 3.5 centimeters. After the hot melt glue solidifies, the tubing is cut to expose the fiber lumens. The fiber OD is measures under a microscope. The tubing with the fiber loop is mounted into a test holder. Isopropyl alcohol (IPA) is poured into the holder, the holder sealed, and gas pressure is set to 13.5 psi. The time interval to collect a set amount of IPA permeate is recorded.

Sample Calculations $$IPA \text{ Flow RATE} = V/(T*\pi*OD*N*L)$$

IPA FlowTime (FT)=seconds to collect 500 ml IPA permeate; calculated from the time measured to collect a convenient volume from the set-up described.

where;

V=volume of permeate

T=time

OD=outside diameter of fiber

N=number of fibers

L=total length of one strand of exposed fiber

Intrusion Pressure Test

Several strands of fiber in the form of loops were fit into a ¼"polypropylene tubing about 1" long. A hot melt gun is used to force hot melt glue through the open end of the tubing to pot the fibers. Normally, the glue does not fill up all the spaces between the fibers. To complete the potting, hot melt glue is applied to the other end of the tube. The length of the fibers, from the end of the potting to the loop, is about 3 inches. After the hot melt glue solidifies, the tubing is cut to expose the fiber lumens. The fiber OD is measures under a microscope. The tubing with the fiber loop is mounted into a test holder and connected to a container holding the test fluid and attached to a pressure generating system, such as a pressurized gas tank. The pressure in the container is raised at increments, for example, 10 psi steps, and the test fluid forced into the lumens of the fibers. Any intrusion of the test fluid is readily observed as a darkening of the fibers from the test fluid filling the pores of the fibers. The pressure of each step is maintained for about 20 minutes, or unless intrusion is observed. If no intrusion is observed, pressure is raised to the next increment and the test continued.

Visual Bubble Point

Two strands of fiber as loops were fit into a ¼"polypropylene tubing about 1" long. A hot melt gun is used to force hot melt glue through the open end of the tubing to pot the fibers. Normally, the glue does not fill up all the spaces between the fibers. To complete the potting, hot melt glue is applied to the other end of the tube. The length of the fibers, from the end of the potting to the loop, should be about 3.5 centimeters. After the hot melt glue solidifies, the tubing is cut to expose the fiber lumens. The fiber OD is measures under a microscope. The tubing with the fiber loop is mounted into a test holder. The potted fiber loop is mounted in a bubble point test holder. The loop is submerged in a glass container of IPA. Air pressure is slowly increased in the lumen of the fibers. The pressure at which the first bubble appears at the outer surface of the fibers is registered as the visual bubble point.

Scanning Electron Microscopy Images

Samples of hollow fiber membrane are soaked in isopropyl alcohol or a mixture of isopropyl alcohol and water, approximately 50% by volume. The wetted sample is then soaked in water to replace the alcohol. The water wetted sample is held by a tweezers and dipped in a container of liquid nitrogen. The sample is then removed and quickly snapped by bending using a pair of tweezers. Approximately 2 millimeter cut sample is fixed to a sample stub with conductive carbon paint (Structure Probe Inc. West Chester Pa.). Microscopy is done with a ISI-DS130c scanning electron microscope (International Scientific Instruments, Inc, Milpitas, Calif.). Digitized images are acquired by a slow scan frame grabber and stored in .TIF format.

EXAMPLE 1

Hyflon MFA® grade 620 (poly(PTFE-CO-PFVAE)) powder obtained from Ausimont USA, Inc., Thorofare, N.J., was used as received. The powder was mixed with HaloVac® 60 solvent from Halocarbon Oil Inc, River Edge, N.J. to produce a paste of 30% by weight polymer solids. The polymer/solvent paste mixture is introduced into a heated barrel of a twin screw Baker-Perkins (Saginaw, Mich.) extruder having 29 mm screws, by means of a Moyno (Springfield, Ohio)progressive cavity pump. The extruder barrel temperatures were set at between 180° C. and 300° C. A Zenith® melt pump (Waltham, Mass.) was used to meter the melt into the special hollow fiber die mentioned above. The die annulus was approximately 300 microns. A low volume flow controller, Brooks Instrument 8744, (Hatfield, Pa.) fed air at controlled rate to maintain the hollow portion of the fiber. The melt pump and air pressure were adjusted to produce a fiber with about a 150 micron thick wall and a 540 micron diameter lumen at a spinning rate of 50 feet per minute. Mineral oil, maintained at 70° C., was used as the cooling bath. After centering the lumen, the die was operated in the horizontal submerged method. The fiber was taken up on a set of Godet rolls. The fiber was extracted with 1,1 dichloro-1-fluorethane, (Florocarbon 141b, ICI) and subsequently dried.

Figure 5:
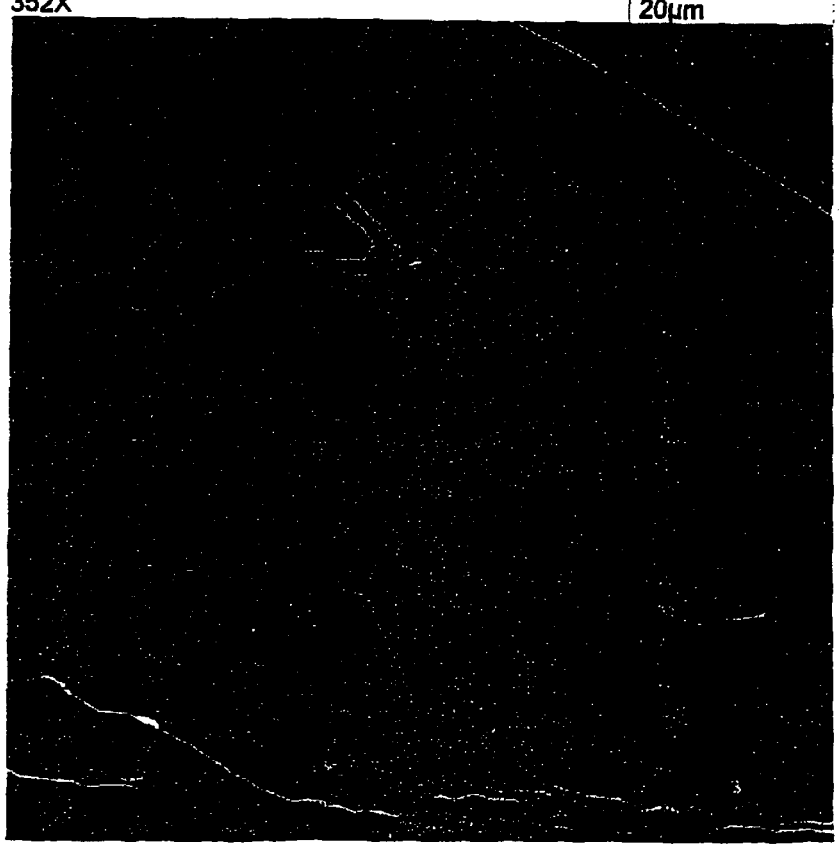
FIG. 5 is a photomicrograph at a magnification of 2352× of the inner surface of a hollow fiber microporous membrane made from poly(tetrafluoroethylene-co-perfluoro (alkylvinylether)) made in accordance with Example 1.
Figure 6:
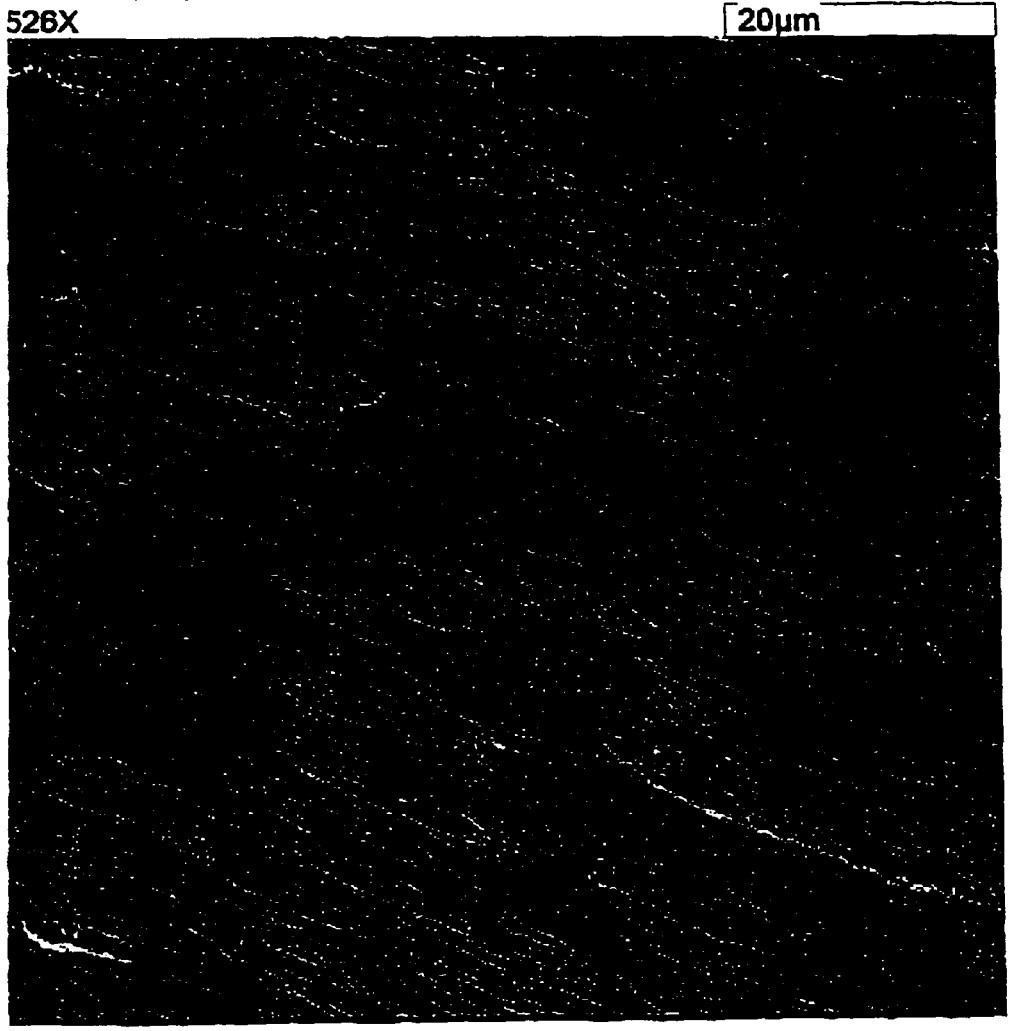
FIG. 6 is a photomicrograph at at a magnification of 2526× of the outer surface of a hollow fiber microporous membrane made from poly(tetrafluoroethylene-co-perfluoro (alkylvinylether)) made in accordance with Example 1.

FIGS. 5 and 6 show the inner and outer surface of this hollow fiber membrane. The inner surface has a skin while the outer surface shows a porous surface.

EXAMPLE 2

Pellets of Hyflon MFA® 620(Poly(PTFE-COPFVAE)) obtained from Ausimont USA, Inc., Thorofare, N.J., were ground to about 300 micron size and were mixed with HaloVac® 60 from Halocarbon Oil Inc, River edge, N.J. to produce a paste of 40% by weight polymer solids. The polymer/solvent paste mixture is introduced into a heated barrel of a twin screw Baker-Perkins (Saginaw, Mich.) extrudor having 29 mm screws. The extruder barrel temperatures were set at between 180° C. and 285° C. A Zenith melt pump (Waltham, Mass.) was used to meter the melt into the special hollow fiber die mentioned above. The die annulus was approximately 300 microns. A low volume flow controller, Brooks Instrument 8744, (Hatfield, Pa.) fed air at controlled rate to maintain the hollow portion of the fiber. The melt pump and air pressure were adjusted to produce a fiber with about a 250 micron thick wall and a 540 micron diameter lumen at a spinning rate of 100 feet per minute. Dioctyl pthalate, maintained at 35° C., was used as the cooling bath. After centering the lumen, the die was operated in the horizontal submerged method. The fiber was taken up on a set of Godet rolls. The fiber was extracted with 1,1-dichloro-1-fluorethane, (Genesolve 2000 Allied-Signal, NJ)and subsequently dried. The fibers had no observable IPA bubble point up to 100 psi, and no measurable IPA flow at that pressure. These results indicate that the membrane skin was non-porous.

EXAMPLE 3

In this example, water is degassed using a membrane made in a manner similar to the membrane of Example 1. A bundle of fibers was made, potted and installed in a cylindrical holder that separated the lumen side from the shell or outer side of the fibers. The fiber ID was $500\mu$ and the fiber wall was about $150\mu$ The number of fibers was about 500 and the length of the module was about 20 cm. Water, at a temperature of 20° C., was pumped through the fiber lumens and a vacuum of 60 Torr was maintained on the shell side. The oxygen level of the water was measured at the inlet and outlet of the membrane bundle at various flow rates.

The same module was used for gasification efficiency. In this mode, water at 20° C. was pumped through the lumen just as before, except that the feed water was degassed by a Hoechst Liquid Cel degasser. The shell side was purged with low-pressure air on one end, while the other end was left open. Because of the low gas flow, there was practically no gas pressure drop on the shell side. For all practical purpose, the absolute gas pressure was assumed to be 760 mm Hg. The oxygen conc. of the feed and the outlet water was measured at different flow rates.

Figure 7:
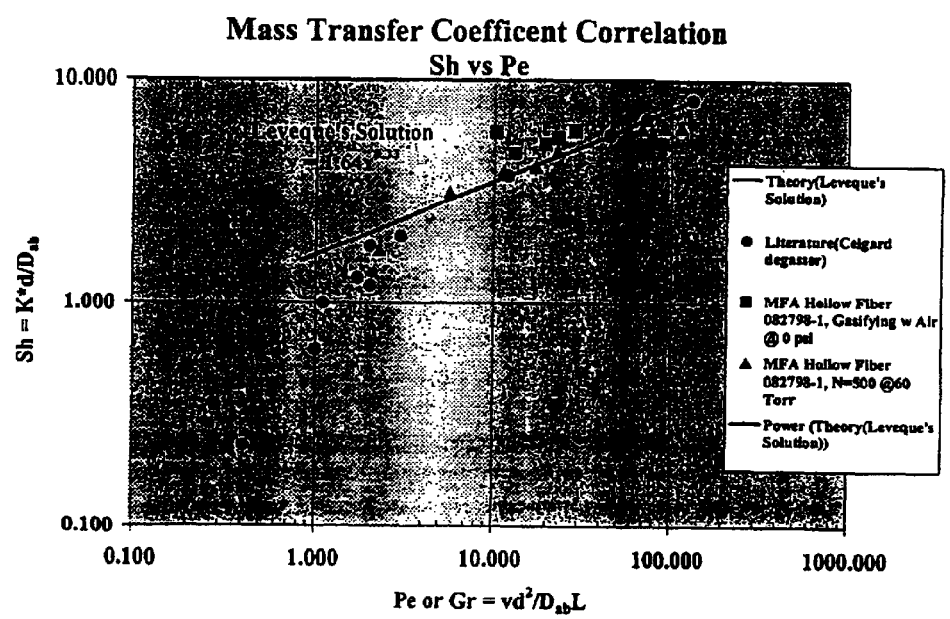
FIG. 7 shows the results of degassing tests run as described in Example 3

FIG. 7 shows the results compared to literature values from product literature for Celgard Liquid Cel® degasser (Hoechst Celanese, Charlotte, N.C.) and theoretical predictions based on Leveque's solution. The method of data analysis is presented below.

The mass transfer coefficient, K, was calculated by the following equation:

$$K=-(Q/A)*\ln[C_{out}-C^*/C_{in}-C^*]$$

where $C_{out}$ is the oxygen conc. in output liquid [ppm]
$C_{in}$ is the oxygen conc. in input liquid [ppm]
$C^*$ is the equilibrium oxygen conc. at the gas pressure on the shell side [ppm]
Q is the flow rate [cc/s]
A is the membrane area [cm$^2$].

The Sherwood number is calculated as follows:

$$Sh=K*D/D_{ab}$$

where

K is the mass transfer coefficient [cm/s],
D is the ID of the fiber [cm] and
$D_{ab}$ is the diffusivity of oxygen in water[cm$^2$/s].

The Graetz or Peclet number is calculated as follows:

$$Pe \text{ or } Gr=V*D^2/(L*D_{ab})$$

Where V is the velocity of flow inside the lumen [cm/s] and L is the length of the fiber [cm]

The Sherwood and Graetz numbers are dimensionless groups used to describe heat and mass transfer operations. The Sherwood number is a dimensionless mass transfer coefficient, and the Graetz number is a dimensionless group that is related to the inverse of the boundary layer thickness.

S. R. Wickramasinghe et al (J. Membrane Sci. 69 (1992) 235–250) analyzed oxygen transport in a hollow fiber membrane contactor using the method of Leveque. A bundle of porous hollow fiber membranes were used. They showed that a plot of the Sherwood number vs. the Graetz number was linear at high values of the Graetz number, in agreement with theoretical predictions. Results at low Graetz number were explained by the polydisperity of fiber diameters, which affects uniformity of flow through the fibers. Their analysis showed that at low Graetz numbers, the average mass transfer coefficient falls below the theoretical prediction due to uneven flow through the fibers. They concluded that oxygen mass transfer was unaffected by the diffusional resistance across the membrane. Conversely, one can conclude that a membrane that follows the prediction of the Leveque theory is porous, because otherwise, the resistance to diffusion would be too high to follow the theory.

The results illustrated in FIG. 7 show that the membranes of this example behave as porous membranes because they follow the linear portion of the Leveque equation at high Peclet numbers. In the linear region, the relationship between the Sherwood number and the Graetz number is given as $Sh=1.64(Gr)^{0.33}$ for Graetz numbers from between about 5 to about 1000.

EXAMPLE 4

Hollow fiber membranes made in a manner similar to Example 1, from a polymer solution of 30%, were potted in MFA in a manner described in concurrent patent application MCA 397, our number, serial number not yet assigned, filed concurrently, the disclosure of which is incorporated by reference. The lumen of the fibers were filled with hexamethyldisilan, a low surface tension liquid obtained from Huls Petrach Systems, Bristol, Pa., which wetted the fibers. One end of the module was attached to a dosed container containing methanol and the pressure raised to 50 psi, forcing methanol into the fiber lumens and through the fiber walls. A permeation rate of 0.65 ml/min at 50 psi was measured. The container and all lines were emptied and N-methyl pyrrolidone (Aldrich Chemical Co. # 24,279-9) was placed in the container. The container was pressurized to 60 psi to flush out the methanol from the fibers. A permeation rate of 0.25 ml/min at 60 psi was measured. The solvent was replaced with a 0.5% solution of polyvinylpyrrolidone in N-methyl pyrrolidone. The module was operated in tangential flow mode with the solution passing from the inlet through the lumens and out the now open outlet port. Three permeate samples were taken, the first after a 30 minutes.

Samples of permeate and feed were analyzed by gel permeation chromatography. A Waters Alliance® 2690 solvent delivery system, 410 refractive index detector and a four-column bank of Styragel® HT (pore sizes $10^3$ Å through 10⁶ Å) were utilized for this work. The mobile phase was NMP, the flow rate was 1.0 ml/min and the injection volume was 100 µl. The sample compartment, column heater and RI detector were equilibrated at 40° C. The following six PS standards were used for calibration; 775K, 402.1K, 43.9K, 30.256K, 7.5K and 2.8K. Samples and PS calibration standards were pre-filtered with 0.5 µm PTFE Millex® filters to protect the column bank. Data was analyzed using GPC for Windows® shareware (Dr. Mat Bullard, Victoria, Australia).

Figure 8:
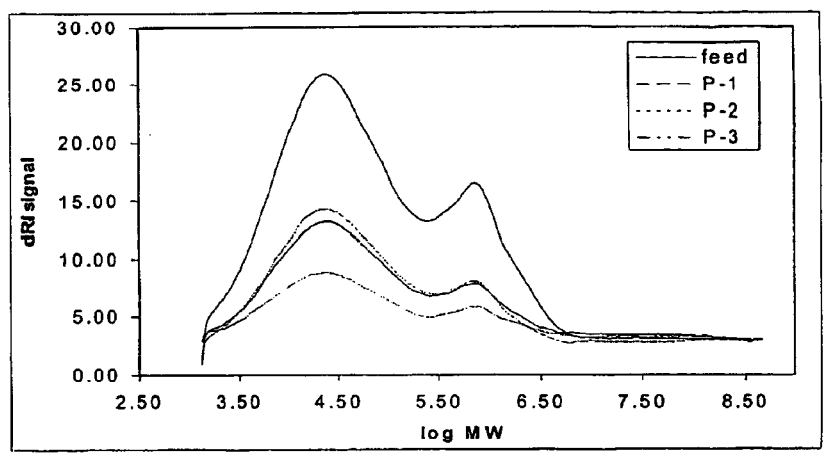
FIG. 8 shows size exclusion chromatography results for the filtration experiment described in Example 4.

FIG. 8 shows the chromatograms for the feed solution and the three permeate solutions. It can be seen that the permeate has a lower concentration of dissolved polymer than the feed. Analysis of the peak heights indicate that the higher molecular weight species are more highly removed.

EXAMPLE 5

An intrusion test was run on a membrane sample produced from a 30% polymer solids solution by a process similar to that described in Example 1. Fiber OD was 750 micron, ID was 485 micron. Isopropyl alcohol was used as the test fluid (surface tension 20.93 mN/m at 25° C., *CRC Handbook of Chemistry and Physics*, CRC Press). At 50 psi, no intrusion was noted after 30 minutes. Some intrusion was noted at 60 psi.

EXAMPLE 6

An asymmetric microporous poly (tetrafluoroethylene-co-perfluoro methyl vinyl ether)(MFA) hollow fiber membrane with a skinned outside surface was prepared by the following method:

A slurry mixture of 16% (w/w) of powder MFA (Hyflon® MFA 620 from Ausimont) in chlorotrifluoroethylene oligomer (CTFE) (Halocarbon Oil #60 from Halocarbon Products) was prepared at room temperature and used for hollow fiber extrusion.

This slurry was fed via a metering pump (FMI model QV) into an extrusion system consisting of a twin-screw extruder (Baker-Perkins model MPC/V-30, LUD=13), a melt pump (Zenith model HPB 5704), a melt filter and a hollow fiber die. The twin screws inside the extruder were configured with feed screw elements and mixing paddles to provide capability for mixing and conveying of the MFA/CTFE melt blend. The screw speed used was 200 rpm. The hollow fiber die in this system has an inner diameter opening of 0.016 in. and an annular gap of 0.017 in. Pure CTFE oil (same grade as in the slurry) was metered into the center channel of the die via a metering pump (Zenith model FF 7298) and it functioned as the lumen filling fluid for the hollow fiber during formation. The temperature set-points for the various zones of the extrusion system ranged from 230° to 305° C. The melt pump's output rate during this experiment was approximately 20 g/min and the lumen oil's feed rate was approximately 10 g/min.

The melt blend in the form of a lumen oil filled fiber was extruded in a horizontal direction Into a quench bath containing re-circulating mineral oil (Britol 35 from Witco) functioning as the quench fluid. The temperature of the oil was maintained at approximately 73° C. by use of external heating. An air gap of approximately 0.25 in. was maintained between the tip of the hollow fiber die and the entrance into the quench bath the quenched fiber was wound around a set of Godet rolls and taken up at a linear speed of 120 fpm. This gel fiber with the oil filled lumen has an OD~800µ and ID~400µ

To remove the CTFE oil from the quenched fiber, a length of the fiber sample was wrapped in multiple loops around an open rectangular metal frame and clamped at both ends. The frame was placed in a degreaser (Baron Blakeslee MLR-LE) containing 1,1 dichloro-1-fluoroethane (Florocarbon 141b, ICI) for approximately 16 hrs. Afterwards, the framed sample was allowed to dry at room temperature and it was then heat-set in an oven at 275° C. for approximately 10 mins.

Figure 9:
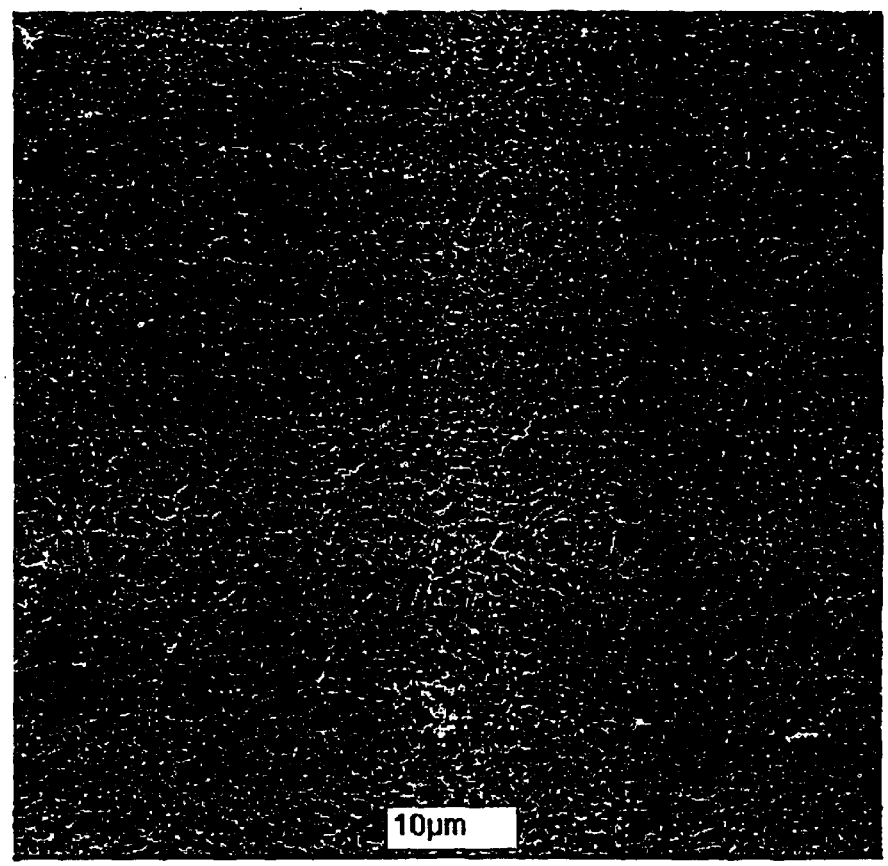
FIG. 9 is a photomicrograph showing a 10 micron scale bar of the outer surface of a hollow fiber microporous membrane made from poly(tetrafluoroethylene-co-perfluoro (alkylvinylether)) made in accordance with Example 6.
Figure 1:
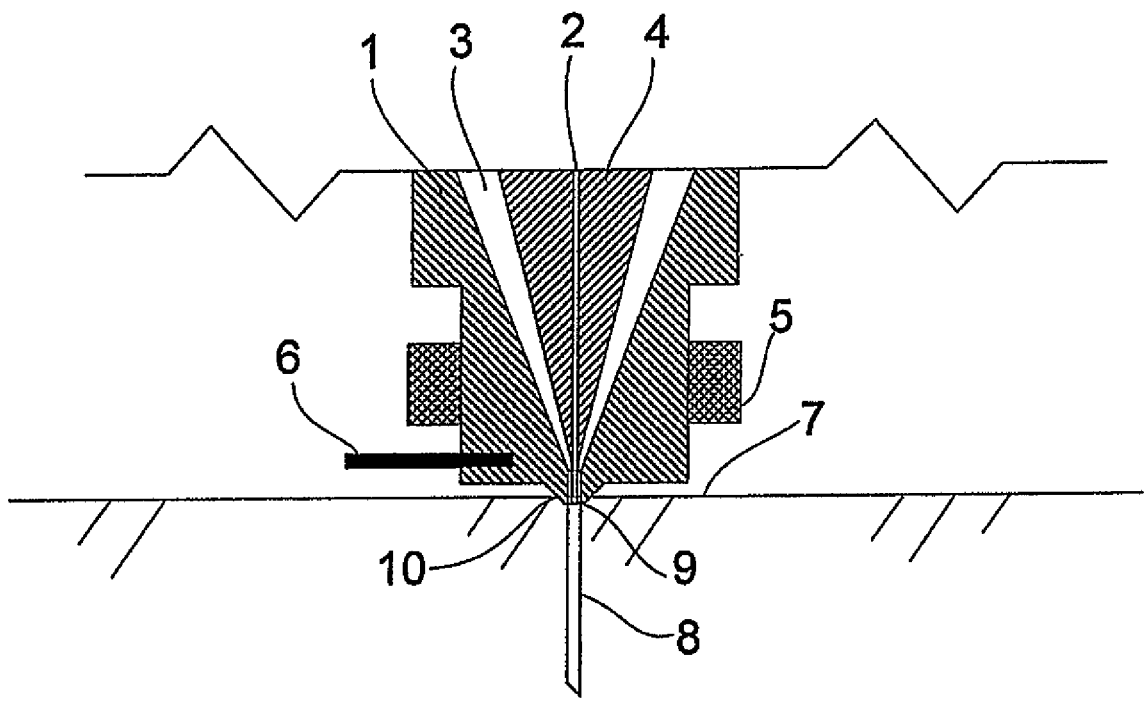
Figure 2:
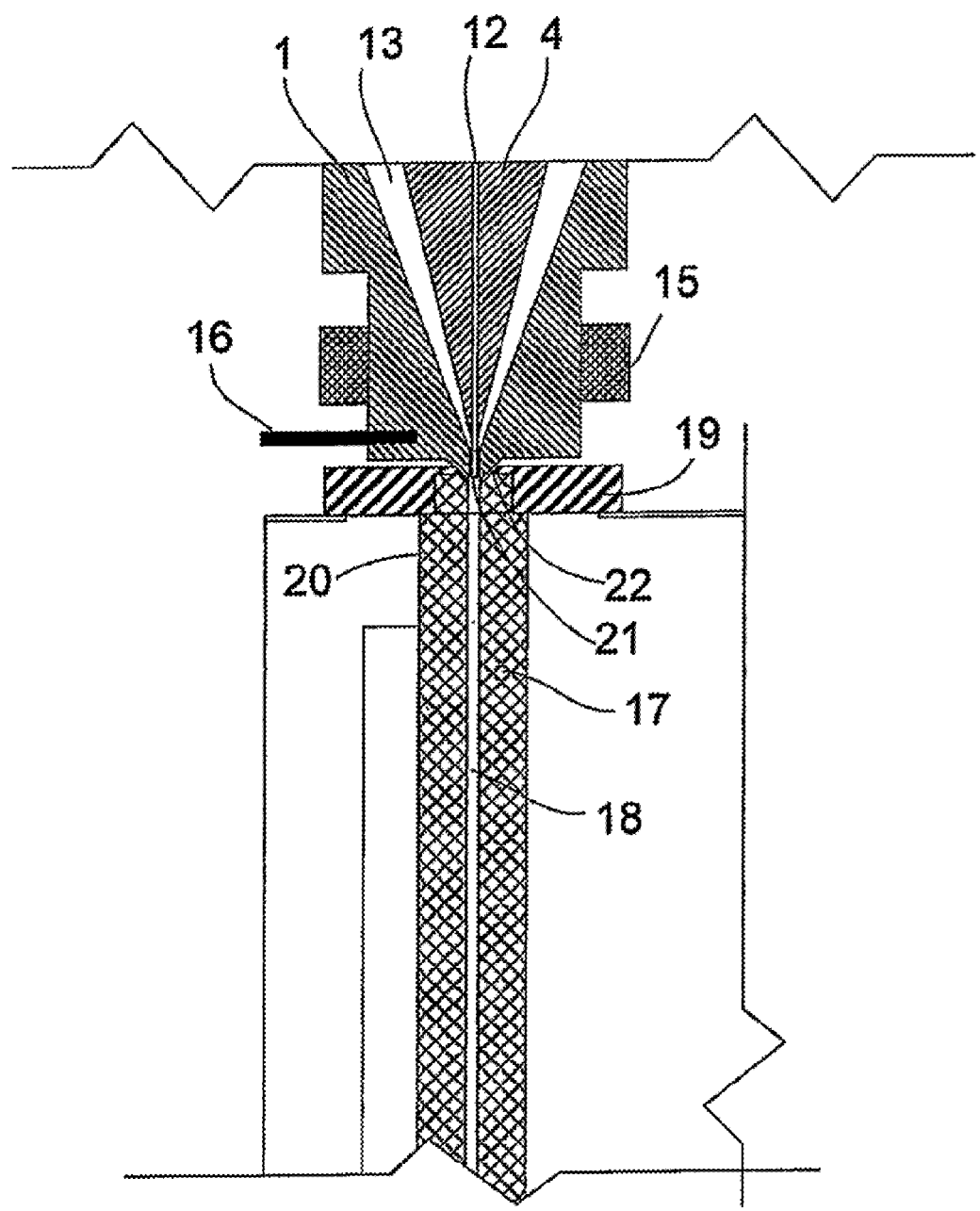
Figure 3:
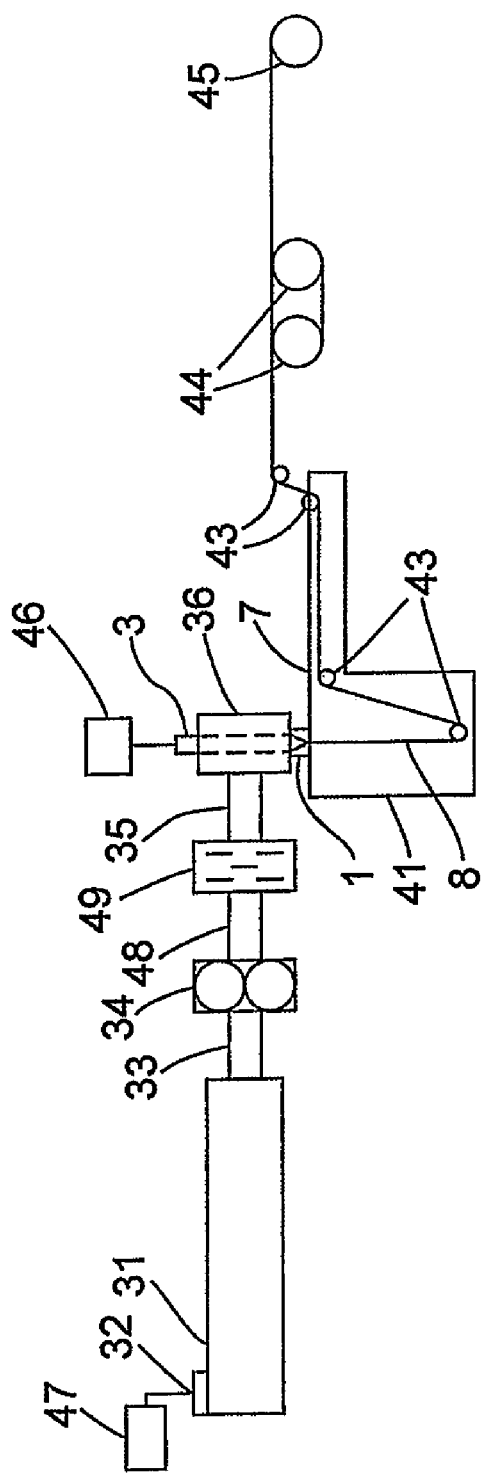
Figure 5:
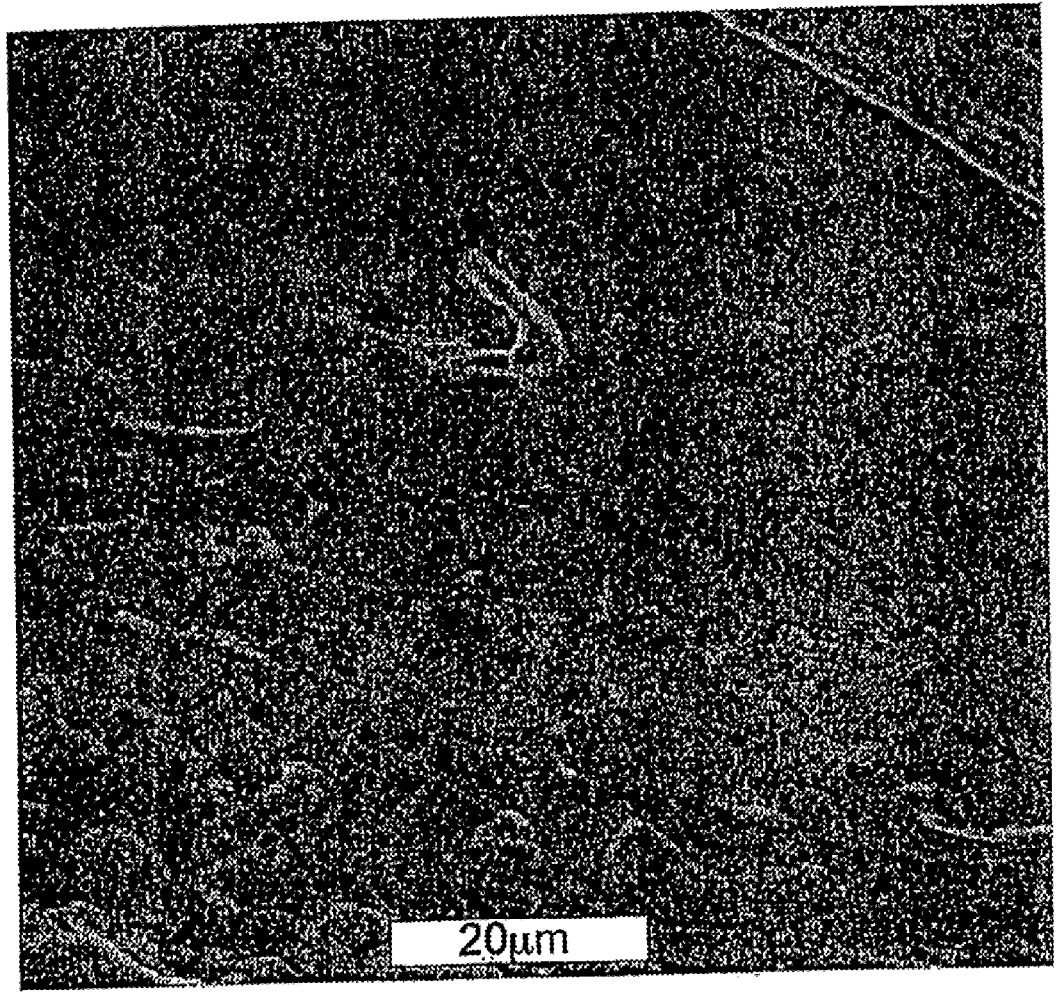
Figure 6:
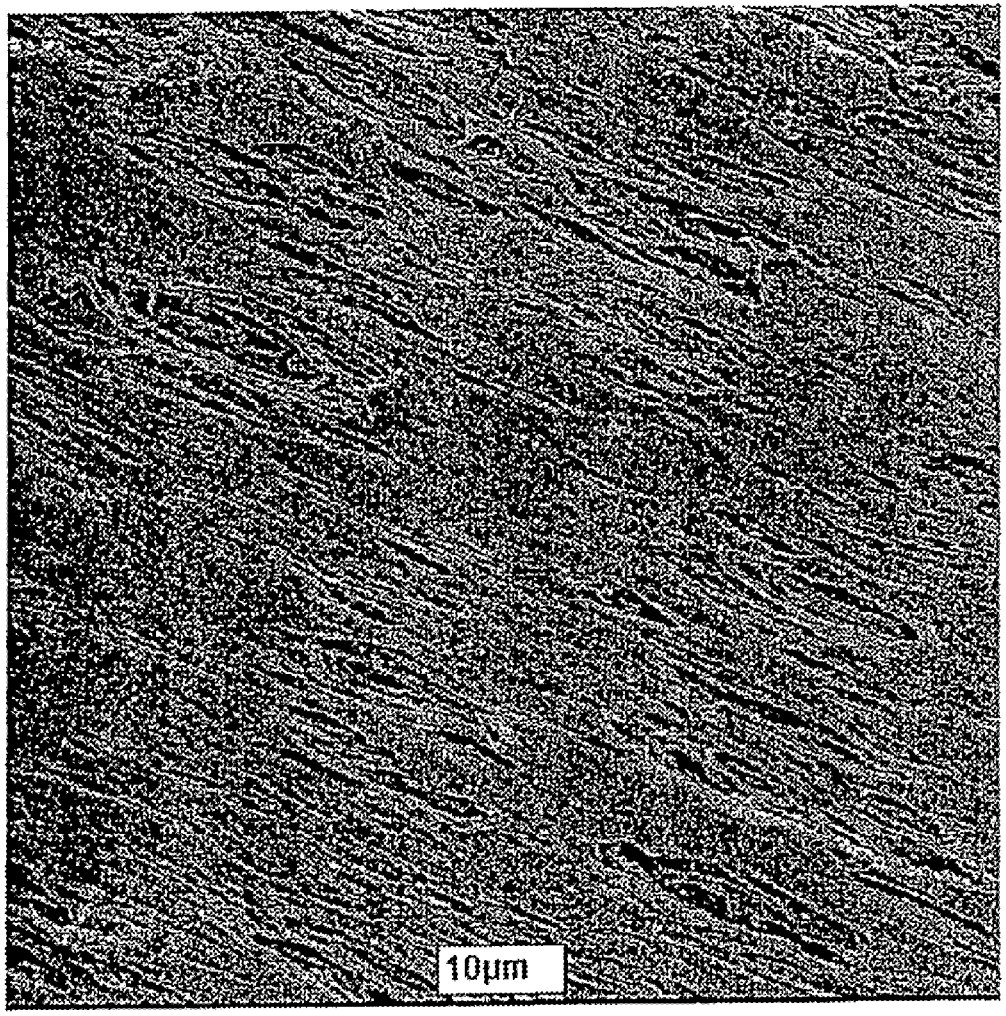
Figure 7:
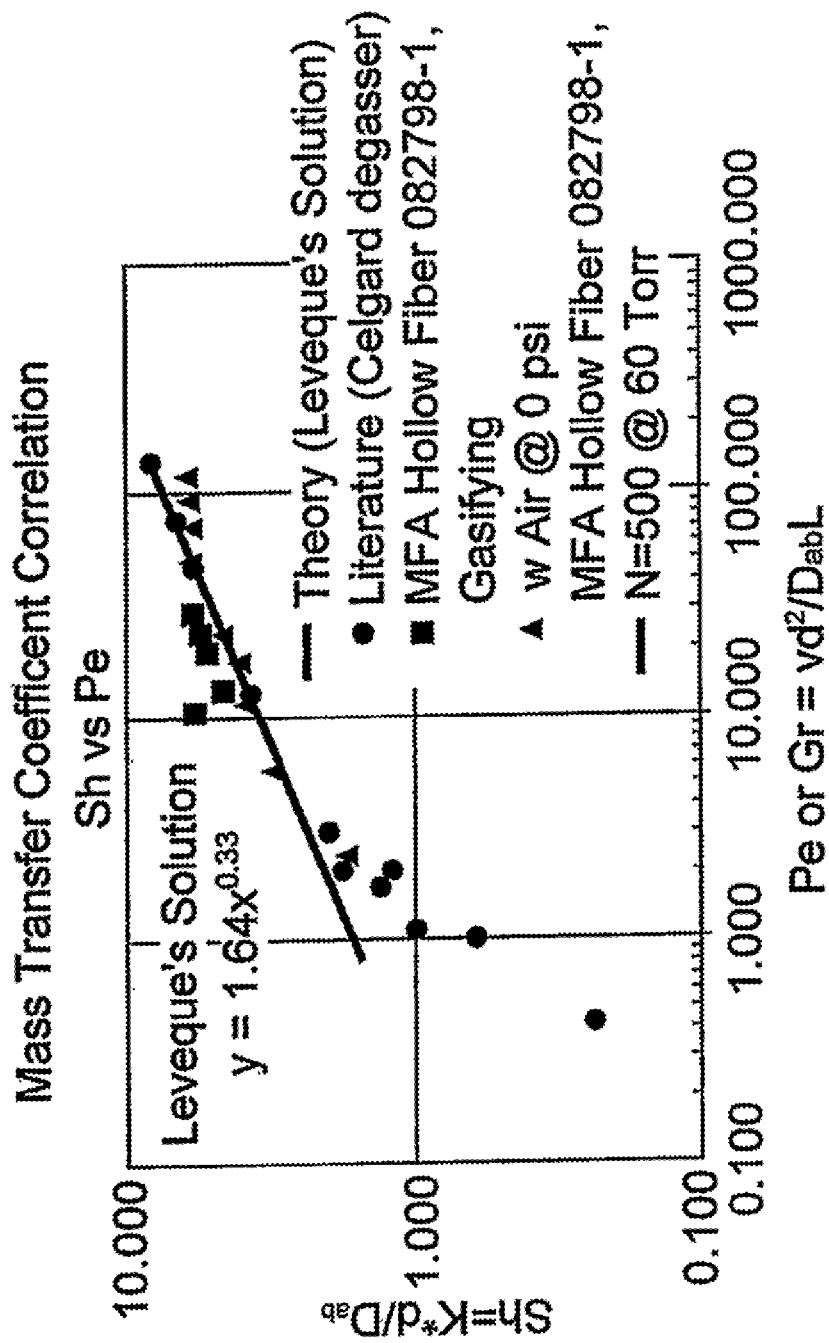
Figure 8:
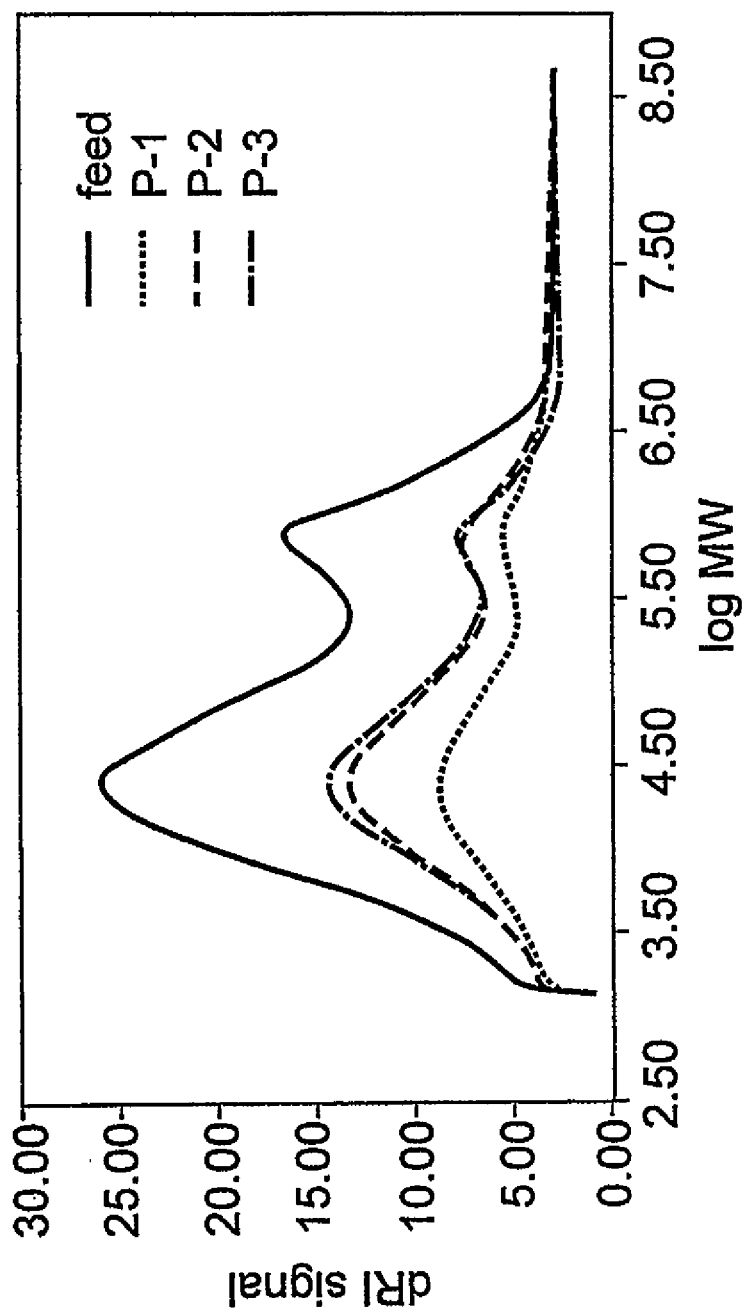
Figure 9:
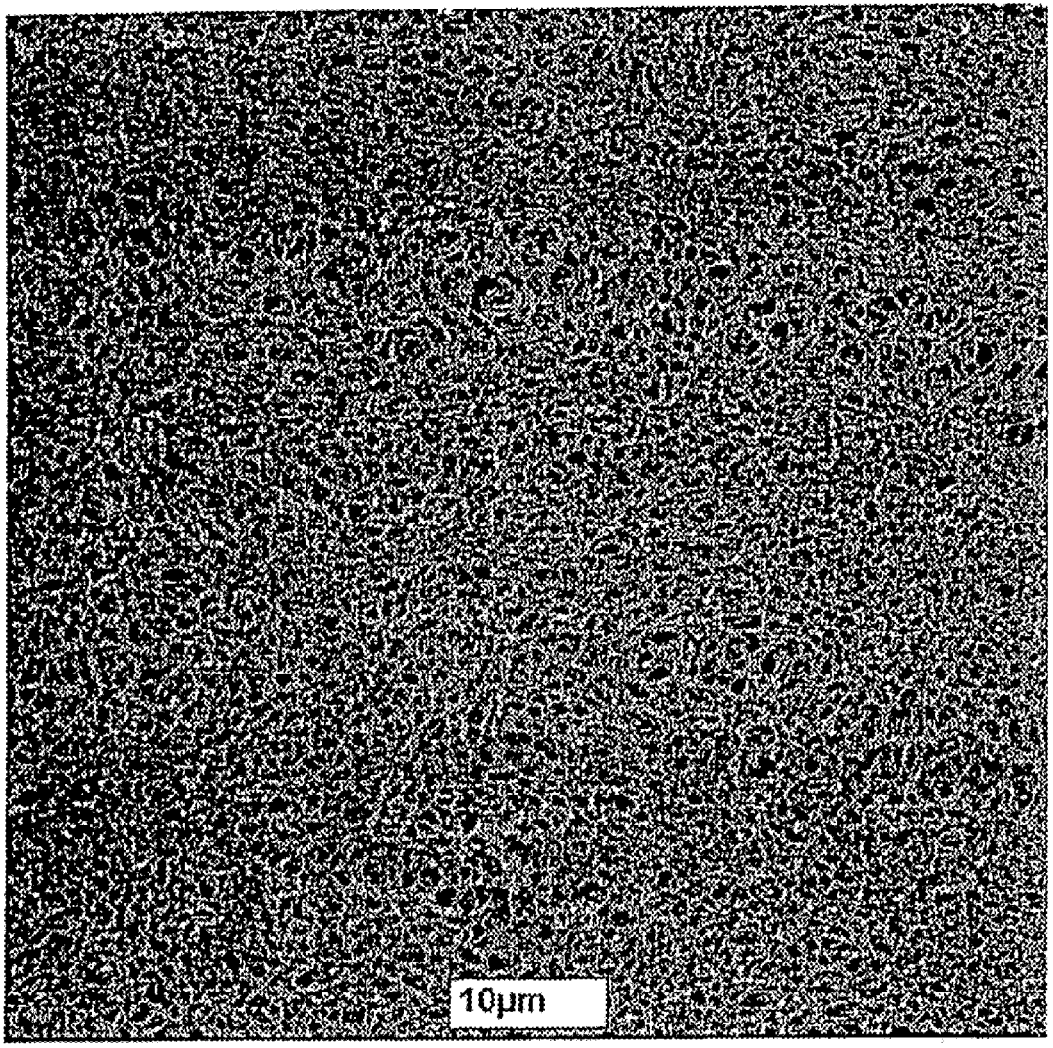
Figure 10:
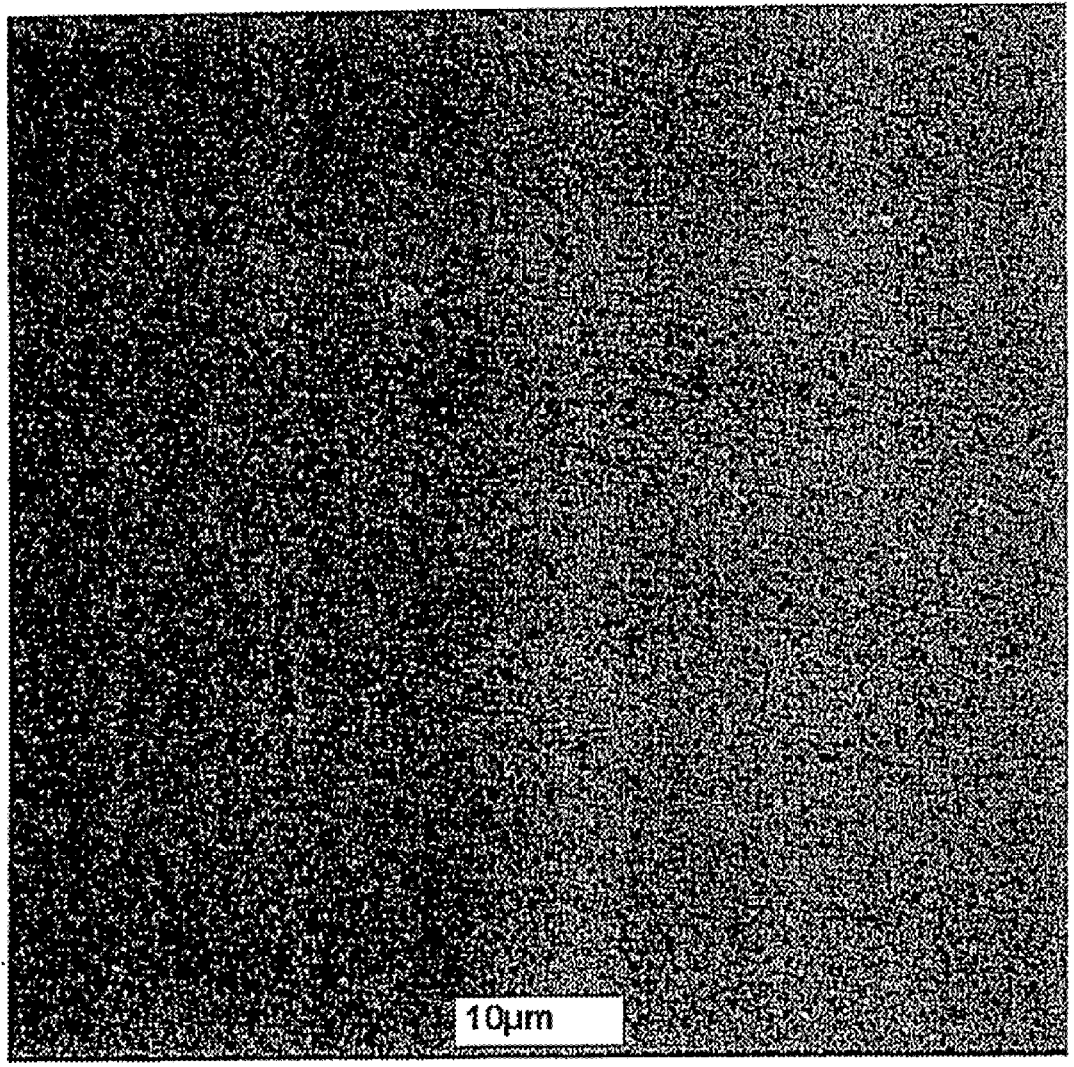
FIG. 10 is a photomicrograph showing a 10 micron scale bar of the inner surface of a hollow fiber microporous membrane made from poly(tetrafluoroethylene-co-perfluoro (alkylvinylether)) made in accordance with Example 6.
Figure 11:
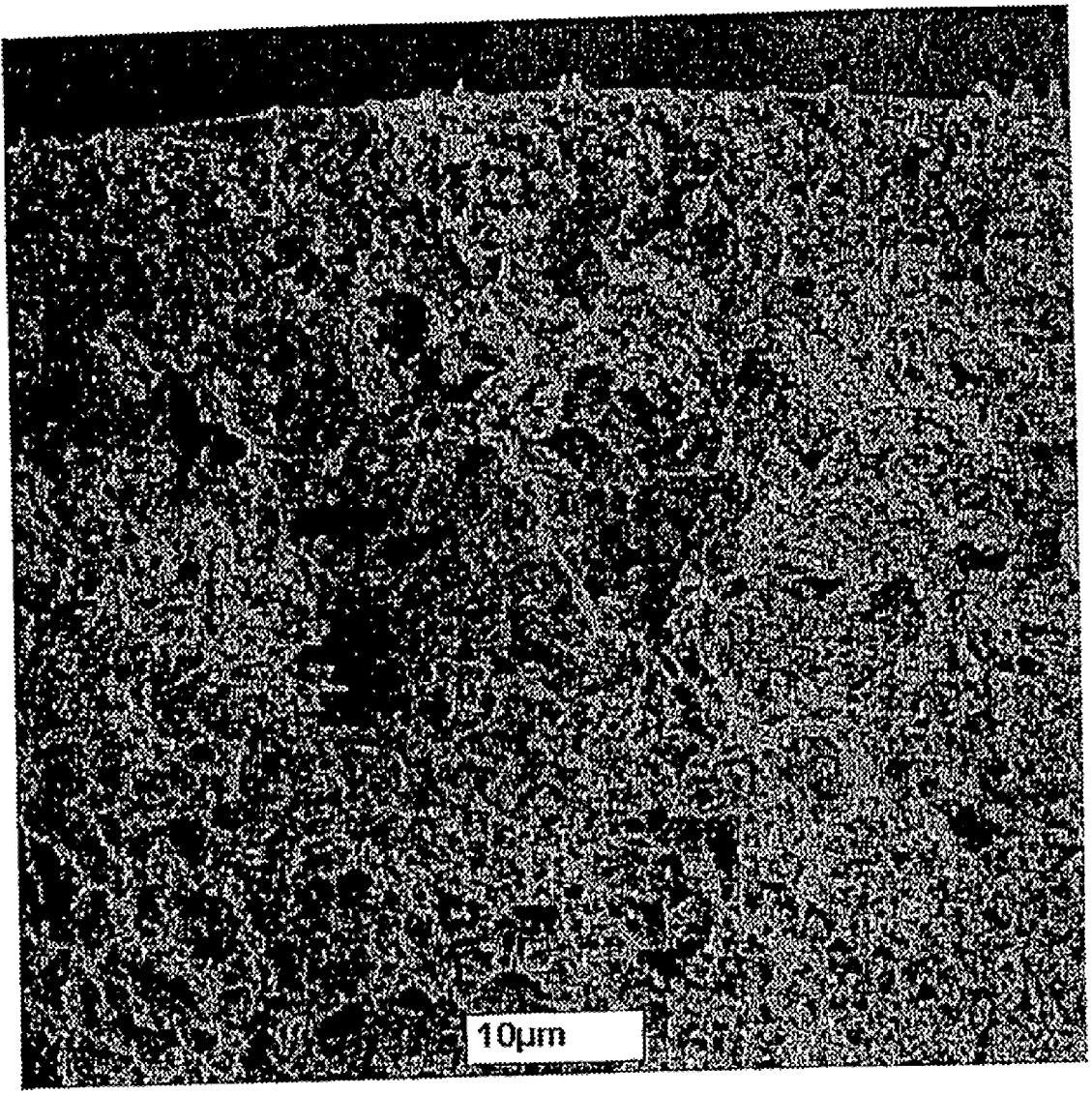
FIG. 11 is a photomicrograph showing a 10 micron scale bar of the cross section near the outer surface of a hollow fiber microporous membrane made from poly (tetrafluoroethylene-co-perfluoro(alkylvinylether)) made in accordance with Example 6.

The final fiber is white in appearance and the scanning electron micrographs of its structure are given in FIGS. 9–11. FIG. 10 shows the morphology of the inside (lumen) surface of the fiber and reveals a highly porous structure. FIG. 9 shows the morphology of the outside surface of the fiber and reveals a much denser structure. FIGS. 11 shows the morphology of the cross-section of the fiber near the outside surfaces and shows that the tight layer on the fiber's outside surface is extremely thin in thickness.

A practitioner skilled in the art of developing and producing hollow fiber membranes will be able to discern the advantages of the present invention. It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventors seek to cover the broadest aspects of the invention in the broadest manner known at the time the claims were made.

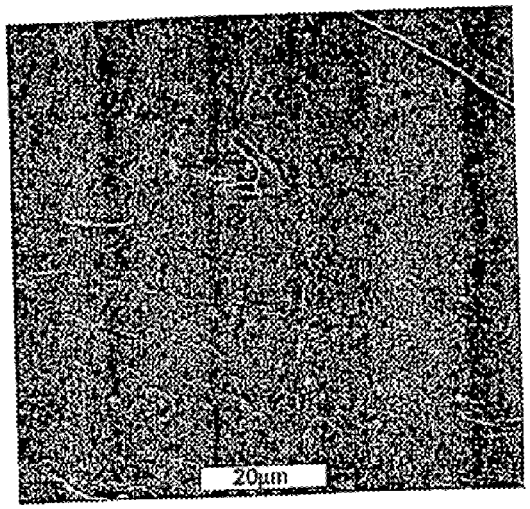

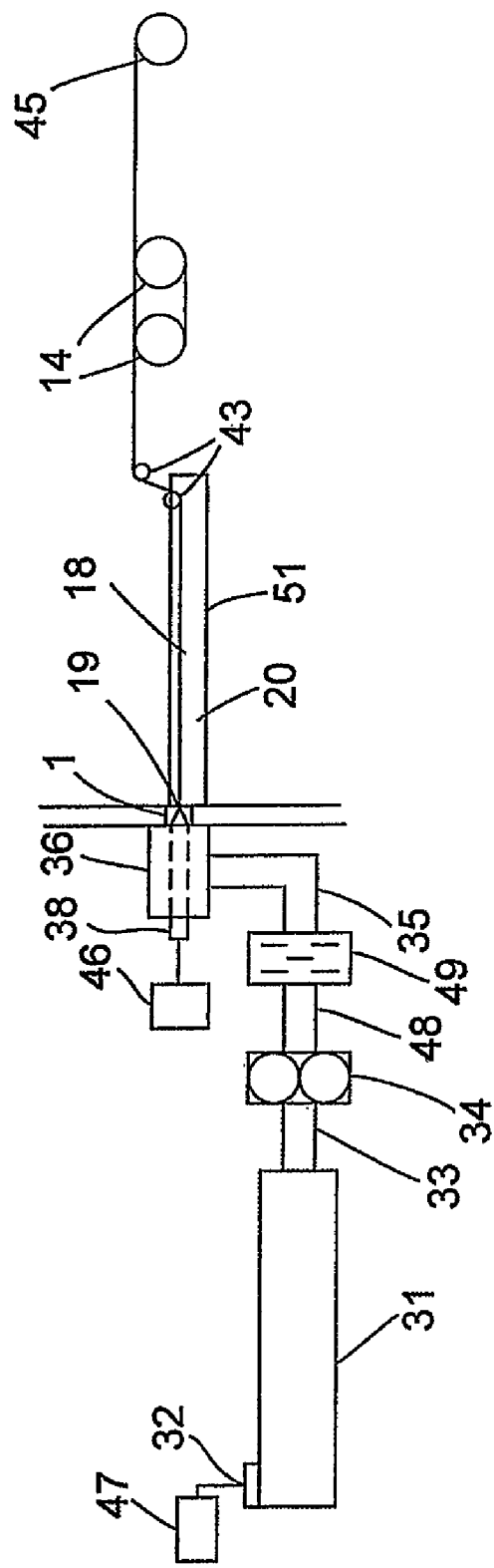

What we claim:

1. A hollow fiber membrane made of a perfluorinated thermoplastic polymer, said membrane having hydrophobic surfaces and comprising a skinned surface on one diameter and a porous surface on the opposite diameter.

2. The membrane of claim 1 wherein the skinned surface is nonporous.

3. The membrane of claim 1 wherein the skinned surface is porous with an average pore size range of from about 2 nanometers to about 50 nanometers.

4. The membrane of claim 1 wherein the membrane is an ultrafiltration membrane.

5. A hollow fiber ultrafiltration membrane made of perfluorinated thermoplastic polymer, said membrane having hydrophobic surfaces and comprising a skinned surface on one diameter and a porous surface on the opposite diameter capable of retaining macromolecular species dissolved in the class consisting of organic solvents, mixtures of organic solvents, organic solvent/water mixtures, mixtures of organic solvents/water mixtures, and water, wherein the members of the class may have other species dissolved therein.

6. The membrane of claim 5 wherein the membrane has a molecular weight cutoff of less than 500,000 Daltons.

7. The membrane of claim 6 wherein the membrane has a molecular weight cutoff of less than 100,000 Daltons.

8. The membrane of claim 7 wherein the membrane has a molecular weight cutoff of less than 50,000 Daltons.

9. The membrane of claim 8 wherein the membrane has a molecular weight cutoff of less than 10,000 Daltons.

10. A hollow fiber membrane contactor comprising a hollow fiber membrane made of a perfluorinated thermoplastic polymer, said membrane having hydrophobic surfaces and comprising a skinned surface on one diameter, and a porous surface on the opposite diameter.

11. The membrane of claim 10, wherein the skinned surface is nonporous.

12. The membrane of claim 10, wherein the skinned surface has a porous surface with an average pore size range of from about 2 nanometers to about 50 nanometers.

13. A hollow fiber contactor membrane made of perfluorinated thermoplastic polymer, said membrane having hydrophobic surfaces and comprising a skinned surface on one diameter and a porous surface on the opposite diameter capable of liquid-gas mass transfer with a Sherwood number equal to about 1.64 times the Graetz number to the 0.33 power in a range of Graetz numbers of from about 5 to about 1000.

14. A hollow fiber contactor membrane made of perfluorinated thermoplastic polymer, said membrane having hydrophobic surfaces and comprising a skinned surface on one diameter and a porous surface on the opposite diameter capable of liquid-gas mass transfer with liquids having surface tension values of grater than about 20 mN/m.

15. A hollow fiber contactor membrane made of perfluorinated thermoplastic polymer, said membrane having hydrophobic surfaces and comprising a skinned surface on one diameter and a porous surface on the opposite diameter capable of liquid-gas mass transfer having an intrusion pressure of greater than about 50 psi with isopropyl alcohol.

16. The membrane of claim 15 having an intrusion pressure of greater than about 10 psi with isopropyl alcohol.

17. The membrane of any one of claims 1, 5, 10, 13, 14 and 15 wherein said perfluorinated thermoplastic polymer is selected from the group consisting of poly(tetrafluoroethylene-coperfluoro(alkylvinylether)), poly(tetrafluoroethylene-co-hexafluoropropylene), and blends thereof.

18. The membrane of claim 17 wherein the alkyl of said poly(tetrafluoroethylene-co-perfluoro(alkylvinylether)) is selected from the group consisting of propyl, methyl, and blends of methyl and propyl.

* * * * *

UNITED STATES PATENT AND TRADEMARK OFFICE
CERTIFICATE OF CORRECTION

| | | |
|---|---|---|
| PATENT NO. | : 6,921,482 B1 | Page 1 of 13 |
| APPLICATION NO. | : 09/889961 | |
| DATED | : July 26, 2005 | |
| INVENTOR(S) | : Cheng et al. | |

It is certified that error appears in the above-identified patent and that said Letters Patent is hereby corrected as shown below:

THE TITLE PAGE SHOWING ILLUSTRATIVE FIGURE, SHOULD BE DELETED AND SUBSTITUTE THEREFORE THE ATTACHED TITLE PAGE

DELETE DRAWING SHEETS 1-11 AND SUBSTITUTE THEREFORE THE DRAWING SHEETS CONSISTING OF FIGS 1-11 AS SHOWN ON THE ATTACHED PAGE.

Signed and Sealed this

Twenty-first Day of August, 2007

JON W. DUDAS
*Director of the United States Patent and Trademark Office*

United States Patent
Cheng et al.

(10) Patent No.: US 6,921,482 B1
(45) Date of Patent: Jul. 26, 2005

(54) SKINNED HOLLOW FIBER MEMBRANE AND METHOD OF MANUFACTURE

(75) Inventors: Kwok-Shun Cheng, Nashua, NH (US); T. Dean Gates, Bedford, MA (US); Larry Y. Yen, Andover, MA (US); Rajnikant B. Patel, Tewksbury, MA (US)

(73) Assignee: Mykrolis Corporation, Billerica, MA (US)

(*) Notice: Subject to any disclaimer, the term of this patent is extended or adjusted under 35 U.S.C. 154(b) by 0 days.

(21) Appl. No.: 09/889,961

(22) PCT Filed: Jan. 27, 2000

(86) PCT No.: PCT/US00/02194

§ 371 (c)(1),
(2), (4) Date: Jul. 24, 2001

(87) PCT Pub. No.: WO00/44482

PCT Pub. Date: Aug. 3, 2000

Related U.S. Application Data
(60) Provisional application No. 60/117,854, filed on Jan. 29, 1999.

(51) Int. Cl.[7] .................. B01D 69/00; B01D 71/28
(52) U.S. Cl. .................. 210/500.23; 210/500.36; 210/500.27; 210/640; 210/321.8; 95/46; 264/41
(58) Field of Search ............... 210/500.36, 500.27, 210/500.23, 490, 321.8; 264/41; 427/244; 96/4; 95/45, 46

(56) References Cited

U.S. PATENT DOCUMENTS

| | | | |
|---|---|---|---|
| 4,478,695 A * | 10/1984 | Ezzell et al. | 205/517 |
| 4,557,955 A * | 12/1985 | Welch et al. | 428/35.5 |
| 4,846,977 A * | 7/1989 | DeVellis et al. | 210/640 |
| 4,902,456 A | 2/1990 | Yen et al. | |
| 4,906,377 A | 3/1990 | Yen et al. | |
| 4,990,294 A | 2/1991 | Yen et al. | |
| 5,032,274 A | 7/1991 | Yen et al. | |
| 5,082,472 A * | 1/1992 | Mallouk et al. | 95/49 |
| 5,154,827 A | 10/1992 | Azhelin et al. | |
| 5,158,680 A | 10/1992 | Kawai et al. | |
| 5,490,931 A | 2/1996 | Cheng, et al. | |
| 5,695,702 A | 12/1997 | Niemeyer | |
| 5,762,789 A | 6/1998 | de los Reyes et al. | |
| 5,855,783 A | 1/1999 | Shucosky et al. | |
| 6,149,132 A * | 11/2000 | Ostrobrod | 254/368 |
| 6,149,810 A * | 11/2000 | Gonzalez-Martin et al. | 210/321.84 |
| 6,582,496 B1 * | 6/2003 | Cheng et al. | 95/46 |

FOREIGN PATENT DOCUMENTS

| | | |
|---|---|---|
| DE | 3444387 | 7/1985 |
| EP | 0 175 432 | 3/1986 |
| EP | 0 217 482 | 4/1987 |
| EP | 0 299 459 | 1/1989 |
| EP | 0 340 732 | 11/1989 |

(Continued)

OTHER PUBLICATIONS

Derwent Publication XP-002142276 Abstract of JP 04 354521.

*Primary Examiner*—Ana Fortuna
(74) *Attorney, Agent, or Firm*—Timothy J. King; Paul J. Cook; Mykrolis Corporation

(57) ABSTRACT

Hollow fiber membranes having a skinned surface on one diameter, and a porous surface on the opposite diameter are produced from perfluorinated thermoplastic polymers by extruding a heated solution of the polymer having a lower critical solution temperature directly into a cooling bath to form the porous membrane by liquid-liquid phase separation. Extrusion can be conducted either vertically or horizontally. The hollow fiber membranes are useful as ultrafiltration membranes and as membrane contactors.

18 Claims, 11 Drawing Sheets